(12) United States Patent
Wong et al.

(10) Patent No.: US 6,708,172 B1
(45) Date of Patent: Mar. 16, 2004

(54) COMMUNITY-BASED SHARED MULTIPLE BROWSER ENVIRONMENT

(75) Inventors: Yin Yin Wong, San Francisco, CA (US); Baldo A. Faieta, San Francisco, CA (US); Derek Chung, San Francisco, CA (US); Ishantha Joseph Lokuge, Redwood City, CA (US); Lalit Balchandani, San Francisco, CA (US)

(73) Assignee: Urbanpixel, Inc., San Francisco, CA (US)

( * ) Notice: Subject to any disclaimer, the term of this patent is extended or adjusted under 35 U.S.C. 154(b) by 465 days.

(21) Appl. No.: 09/596,305

(22) Filed: Jun. 14, 2000

Related U.S. Application Data

(60) Provisional application No. 60/171,840, filed on Dec. 22, 1999.

(51) Int. Cl.[7] .......................... G06F 17/30; G06F 7/00; G09G 5/00
(52) U.S. Cl. .......................... 707/10; 707/8; 345/738; 345/751; 345/1.3
(58) Field of Search ................................. 345/854, 786, 345/838, 751, 747, 848, 849, 738, 778; 709/329, 219; 707/3, 10; 703/21

(56) References Cited

U.S. PATENT DOCUMENTS

| | | | |
|---|---|---|---|
| 5,634,064 A | | 5/1997 | Warnock et al. |
| 5,808,613 A | | 9/1998 | Marrin et al. |
| 5,877,766 A | | 3/1999 | Bates et al. |
| 5,878,219 A | * | 3/1999 | Vance et al. ............. 709/219 |
| 5,880,974 A | * | 3/1999 | Tarumi et al. ............ 703/21 |
| 5,918,236 A | | 6/1999 | Wical |
| 5,974,572 A | | 10/1999 | Weinberg et al. |
| 5,977,972 A | * | 11/1999 | Bates et al. ............. 709/328 |
| 6,182,073 B1 | * | 1/2001 | Kukkal ................. 345/738 |
| 6,243,091 B1 | * | 6/2001 | Berstis ................. 345/839 |
| 6,314,458 B1 | * | 11/2001 | Steele et al. ............ 709/219 |
| 6,397,264 B1 | * | 5/2002 | Stasnick et al. .......... 707/3 |
| 6,405,222 B1 | * | 6/2002 | Kunzinger et al. ....... 715/501.1 |
| 6,418,429 B1 | * | 7/2002 | Borovoy et al. .......... 1/1 |
| 6,433,795 B1 | * | 8/2002 | MacNaughton et al. .... 709/217 |
| 6,460,060 B1 | * | 10/2002 | Maddalozzo et al. ..... 1/1 |

FOREIGN PATENT DOCUMENTS

| | | |
|---|---|---|
| WO | WO 98/35469 | 8/1998 |
| WO | WO 99/10802 | 3/1999 |
| WO | WO 99/44379 | 9/1999 |

OTHER PUBLICATIONS

Jason Leigh, Andrew E. Johnson, and Thomas A. DeFanti (1997), Issues in the Design of a Flexible Distributed Architecture for Supporting Persistence and Interoperability in Collaborative Virtual Environments.*
http://www.activeworlds.com/index.html, Internet, Jun. 14, 2000, pp. 1–8.
http://alts1.kodak.com/global/mul/photoquilt/millennium/, Kodak PhotoQuilt, Internet, Jun. 14, 2000, pp. 1–2. Printed Jun. 14, 2000.

(List continued on next page.)

*Primary Examiner*—Safet Metjahic
*Assistant Examiner*—Merilyn Nguyen
(74) *Attorney, Agent, or Firm*—Beyer Weaver & Thomas LLP

(57) ABSTRACT

A web browsing environment that provides a graphical spatial context to associate web sites to one another and allows for interaction between users browsing the space is provided. One feature of the described embodiment is the provision of a tiling of mini browsers in one space rather than a document.

30 Claims, 30 Drawing Sheets

OTHER PUBLICATIONS http://www.icontown.de/home.htm, Icon Town–Welcome home, Internet, Jun. 14, 2000, pp. 1–2.

wysiwyg://90/http://www.communities.com/welcome/index.html, The Palace Visual Chat–Communities, Internet, Jun. 14, 2000, pp. 1–4.

http://www.ubique.com/main/main_home.html, Internet, Jun. 14, 2000, pp. 1–9.

wysiwyg://134/http://www.gooey.com/, Gooey, Internet, Jun. 14, 2000, pp. 1–4.

http://www.odigo.com/new/main.html, Odigo . . . Communication Redefined, Internet, Jun. 14, 2000, pp. 1–9.

Dürsteler, Juan C., "Urban Pixel & Vios: cities in the Net", The digital magazine of InfoVis.net, XP–002256272, Oct. 30, 2000, page 1.

TOG: "Urbanpixel –Visible Navigation for the Web", Ask-Tog, XP–002256273, Oct. 2000, page 1.

* cited by examiner

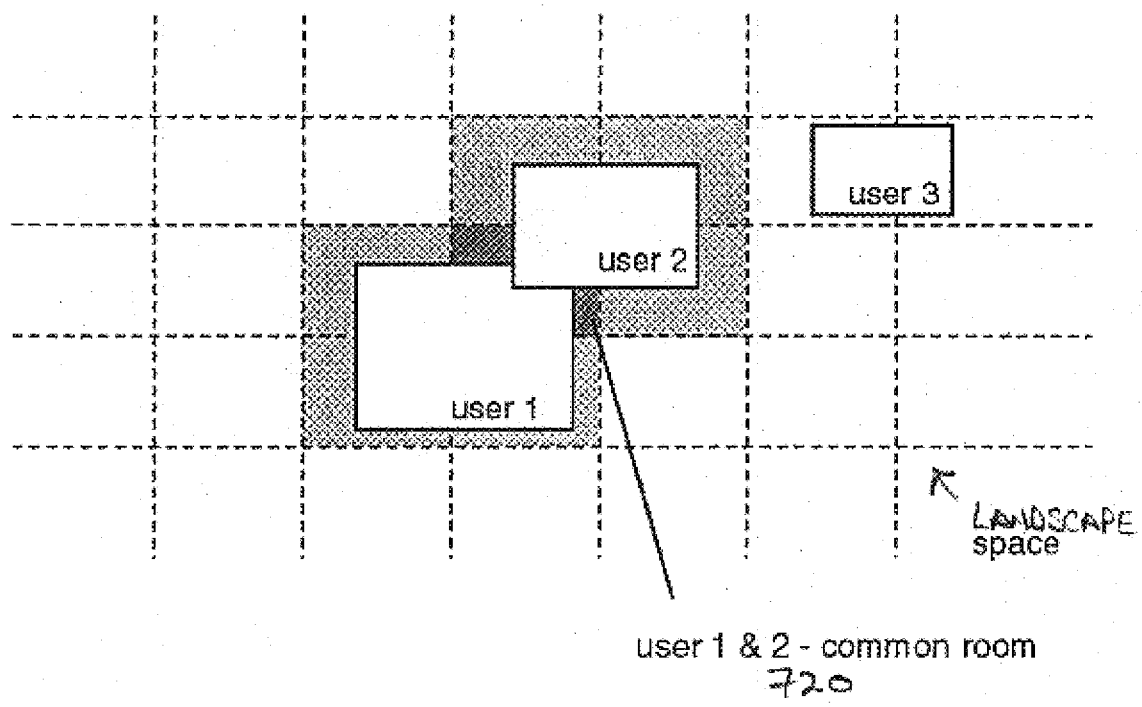

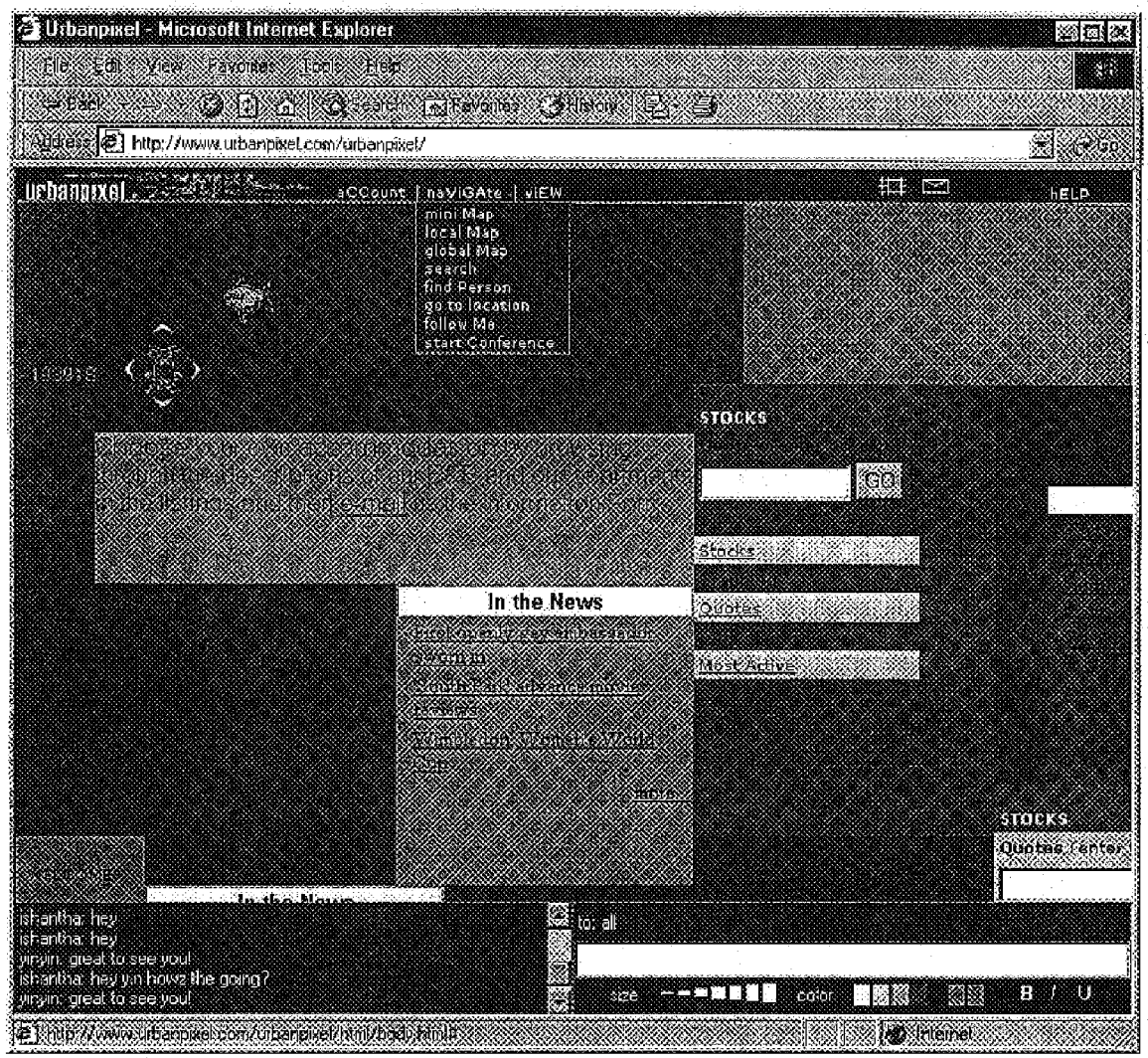
FIG-CB

COMMUNITY-BASED SHARED MULTIPLE BROWSER ENVIRONMENT

CROSS REFERENCE TO RELATED APPLICATIONS

This application claims priority to Provisional U.S. Patent Application No. 60/171,840 filed Dec. 22, 1999 entitled, COMMUNITY IN A SHARED MULTIPLE BROWSER ENVIRONMENT, which is incorporated by reference herein in its entirety and for all purposes.

This application is related to concurrently-filed U.S. patent application Ser. No. 09/596,224 entitled, SPATIAL CHAT IN A SHARED MULTIPLE BROWSER ENVIRONMENT, which is incorporated by reference herein in its entirety and for all purposes.

BACKGROUND OF THE INVENTION

The present invention relates to browsing and interacting in an computer network environment. In particular, the invention relates to novel computer network user interface methods and associated systems and applications that provide information organization and retrieval and as well as user interaction in ways that enhance the user's experience of a computer network environment, particularly the Internet.

A computer network is a geographically distributed collection of interconnected communication links for transporting data between nodes, such as computers. By definition, a network is a group of computers and associated devices that are connected by communications facilities or links. Network connections can be of a permanent nature, such as via cables, or can be of a temporary nature, such as connections made through telephone or other communication links. A plurality of computer networks may be further interconnected by intermediate nodes, or routers, to extend the effective "size" of the networks, smaller portions of which may be maintained as autonomous domains of nodes. A router is computer system that stores and forwards data packets from one local area network (LAN) or wide area network (WAN) to another. Routers see the network as network addresses and all the possible paths between them. They read the network address in a transmitted message and can make a decision on how to send it based on the most expedient route (traffic load, line costs, speed, bad lines, etc.). Routers typically communicate by exchanging discrete "packets" of data according to predefined protocols. In this context, a protocol comprises a set of rules defining how the nodes interact with each other.

Networks vary in size, from a local area network (LAN) consisting of a few computers and related devices, to a wide area network (WAN) which interconnects computers and LANS that are geographically dispersed. An internetwork, in turn, is the joining of multiple computer networks, both similar and dissimilar, by means of gateways or routers that facilitate data transfer and conversion from various networks. A well known abbreviation for internetwork is internet. As currently understood, the capitalized term Internet refers to the collection of networks and gateways that uses a Transmission Control Protocol/Internet Protocol (TCP/IP). The Internet has recently seen explosive growth by virtue of its ability to link computers located throughout the world.

A LAN is a communication network that serves users within a confined geographical area. It is made up of servers, workstations, a network operating system and a communications link. Servers are high-speed machines that hold programs and data shared by all network users. The workstations, or clients, are the users' personal computers, which perform stand-alone processing and access the network servers as required. In some contexts, the term "client" may also refer to software running on a client machine. The controlling software in a LAN is the network operating system, such as, for example, NetWare, UNIX, and/or Appletalk, which resides in the server. Message transfer is managed by a transport protocol such as, for example, IPX, SPX, SNA and/or TCP/IP. The physical transmission of data is performed by the access method (Ethernet, Token Ring, etc.) which is implemented in the network adapters that plug into the machines. The actual communications path is the cable (twisted pair, coax, optical fiber) that interconnects each network adapter.

The linking of a plurality of computer systems into a network of computer systems is a well known technology. In this way, the collective resources available within the network may be shared among all connected users. With the growth of the Internet, a worldwide interconnection of millions of computers, sharing of computer resources has been brought to a wide audience. The Internet has become an important communication tool for individuals, businesses and governments, and cultural medium for both information and entertainment.

The World Wide Web (or "web" or "WWW") is the Internet's multimedia information retrieval system. It is the most commonly used method of transferring data in the Internet environment. Client machines communicate with web servers using the Hypertext Transfer Protocol (HTTP), which is a known application protocol providing users access to files, e.g., text, graphics, images, sound, video, using a standard page description language known as the Hypertext Markup Language (HTML), as is well known to those of skill in the art. HTML provides basic document formatting and allows the developer to specify "links" to other servers and files. Further details regarding HTML and the World Wide Web generally may be found on the World Wide Web Consortium's web site at www.w3.org, the disclosure of which is incorporated by reference herein. In the Internet paradigm, a network path to a server is identified by a Uniform Resource Locator (URL) having a specific syntax for defining a network connection.

Retrieval of information in a large computer network environment, such as the Internet, is generally achieved by the use of an HTML-compatible "browser", e.g., Netscape Navigator, Microsoft Explorer, etc., at a client machine. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML. Web browsers have become the primary interface for access to many network and server services and their use and operation are well understood in the art.

The global proliferation of the Internet has enabled easy creation and access of a myriad of information types. Although more and more users and businesses have published their own web sites, there is no fabric linking them together—just a fragile collection of links, some broken, some outdated. It is often difficult for a user to remember how to find a site or page without the address (URL) or a reference point (e.g., a bookmark). Search engines and directories attempt to catalog, sort and make sense of this mass of information, but at best, they provide snapshots of an everchanging and growing universe of information. From the users' perspective, conventional web browsers make surfing the web a solitary experience; there is no help navigating the mass of information and no connection to other users browsing on the internet at any one time. Even if users can communicate through chat and instant messaging, these tools are typically segregated from the main web site in which the user is browsing. Thus, communication between users takes place outside of the information context.

While several approaches are being created to integrate chat with web pages, few if any have sought solutions to problems associated with the act of web browsing. Pervasive problems include: There is no correlation between the information being browsed and the people browsing the information; this has created a flat empty electronic space lacking any kind of character or context in which people communicate. Also, there is no spatial context to associate web sites with one another or to a well-known landmark. In addition, weak navigation paradigms make it difficult for users to locate previously visited and new web sites or to find "popular" sites. For example, social browsing, the ability to ask others for information while browsing, is not supported as a part of the navigation paradigm. This is true both in browsing among web sites and in navigating within a web site.

Thus, improved web browsing mechanisms that address these problems are needed.

SUMMARY OF THE INVENTION

The present invention addresses the above problems by providing a web browsing environment that provides a graphical spatial context to associate web sites to one another. Conventional computer network interfaces (e.g., web browsers) provide an environment in which a user may feel as though they are browsing discrete pages not connected to other people. One feature of a web browsing environment (computer network user interface system) in accordance with an embodiment of the present invention is a shared multiple browser format. The shared multiple browser format provides a system that is analogous to being in a city which is alive with people, activities and commerce. Users may browse by panning over a continuous space within a spatial context amongst other users. Information as well as people, visually represented in the form of character proxies, inhabit the space giving its inhabitants a richer and personalized sense of place. Users can participate in group events and communicate within a spatial context. In one embodiment, similar to a city, a market mechanism allows the space to be self-organized and to evolve organically in response to the inhabitants of the space.

Computer network user interface methods and associated systems and applications in accordance with embodiments of the present invention may integrate the information with a community of users browsing the information into one environment. They can also create a fabric linking web sites together by building a self-organizing spatial landscape of the Internet. In addition, they can introduce a navigation paradigm that takes advantage of the spatial and social aspects of the integrated environment. Such a navigation paradigm can also be advantageously applied within a web site, for example in an implementation of a virtual store. Web browsing environments in accordance with the invention may also allow for interaction between users browsing the space.

In one aspect, the invention provides a computer network user interface. The interface includes a computer network browsing environment having a graphical spatial context to associate web sites to one another.

In another aspect, the invention provides a computer network system. The system includes one or more network servers each having a processor and a memory, and one or more network clients connected with the network servers each having a processor, a memory, a display, and a network connector. The system also includes a network user interface having a computer network browsing environment which provides a graphical spatial context to associate web sites to one another.

It still another aspect, the invention provides a method, implemented on a computer system, for providing a computer network browsing environment. The method involves integrating information from browsing the computer network into a single graphical spatial environment. Also provided is a computer program product for effecting a method in accordance with the present invention.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 7A–C illustrate aspects of a spatial chat feature in accordance with some embodiments of the present invention.

FIGS. 8A–C depict screen shots illustrating aspects of a graphical user interface for a system in accordance with the present invention.

DETAILED DESCRIPTION OF SPECIFIC EMBODIMENTS

Figure 1A:
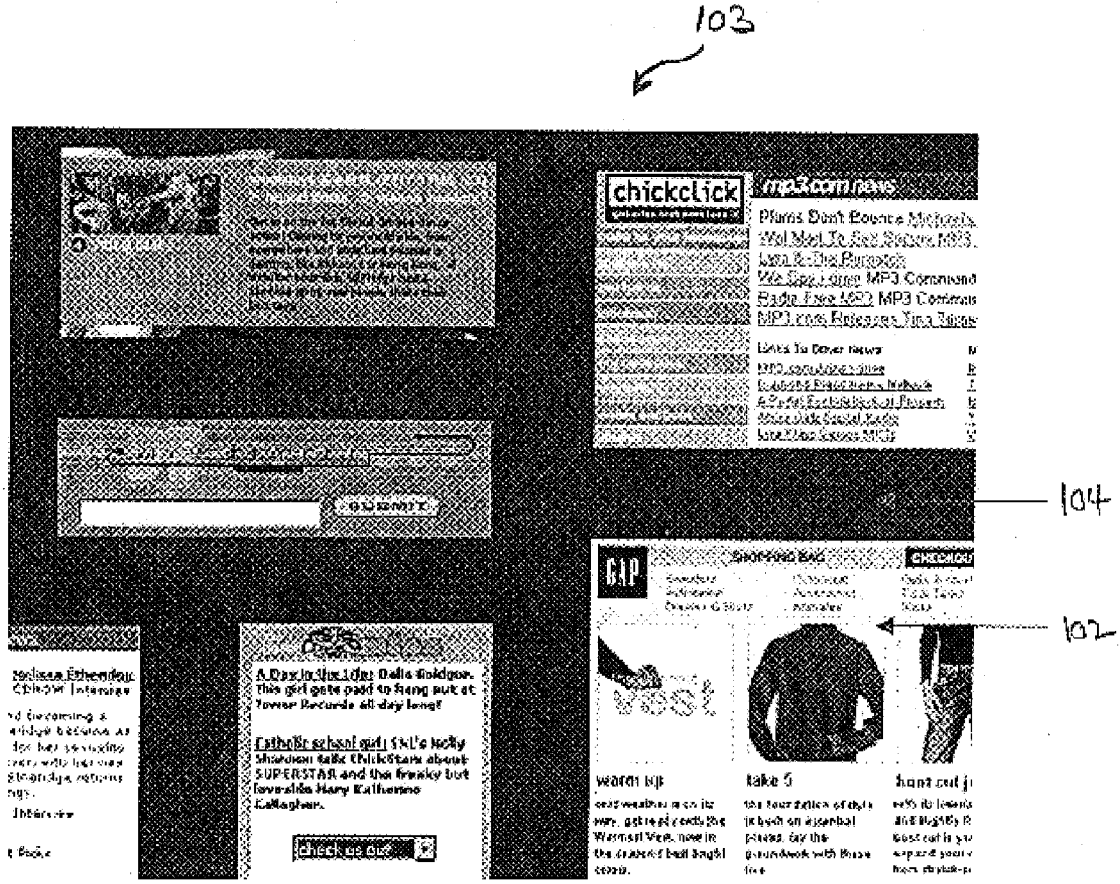
FIG. 1 depicts an example of web pages organized in accordance with an embodiment of the present invention.

Reference will now be made in detail to some specific embodiments of the invention. Examples of these specific embodiments are illustrated in the accompanying drawings.

While the invention will be described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention provides a web browsing environment that provides a graphical spatial context to associate web sites to one another. One feature of a web browsing environment (computer network user interface system) in accordance with the present invention is a tiling of mini browsers in a space rather than a document. Web browsing environments in accordance with the invention may also allow for interaction between users browsing the space.

Computer network user interface methods and associated systems and applications in accordance with the present invention may integrate the information with a community of users browsing the information into one environment. In some embodiments, they can also create a fabric linking web sites together by building a self-organizing spatial landscape of the Internet. In addition, they can introduce a navigation paradigm that takes advantage of the spatial and social aspects of the integrated environment. Such a navigation paradigm can also be advantageously applied within a web site, for example in an implementation of a virtual store. Web browsing environments in accordance with the invention may also allow for interaction between users browsing the space.

INTRODUCTION

Conventional computer network interfaces (e.g., web browsers) provide an environment in which a user may feel as though they are browsing in an empty electronic space. The shared multiple browser format of one embodiment of the present invention provides a system that is analogous to being in a city which is alive with people, activities and commerce. Users browse within a spatial context amongst other users. Information as well as people, visually represented in the form of character proxies, inhabit the space giving its inhabitants a richer and personalized sense of place. Users can participate in group events and communicate within a spatial context. Similar to a city, a market mechanism allows the space to evolve organically in response to the inhabitants of the space.

The present invention provides several features, some or all of which may be integrated into computer network browsing systems to provide and improved web browsing experiences for users. Each of these features embodies a concept underlying the system's organization, including: Place, Presence and Persona. In addition, systems in accordance with the present invention provide novel navigation features to leverage the nature of the system's organization. These features are further described below with reference to the accompanying figures and non-limiting examples. The system is also further described with reference to its components and implementation.

CONCEPTUAL FEATURES

Place

Just as in the real world, our memories are organized within a spatial context, the web browsing environment of the present invention is designed to enable users to remember how to get to a particular area or page after having browsed in it a few times. This organization is fostered by presenting a complex web site like a (two-dimensional) city. Using this analogy, the real estate plots of a city would correspond to HTML pages laid out spatially on a very large sheet. The invention provides a spatial layout of web pages on a two-dimensional sheet offering users a shared mental map of the web. The sheet is populated and evolved through a self-organizing process. Negative space between the pages forms a pattern like a city street network. This approach creates a spatial context to associate web pages to each other or to landmarks typical in a city.

FIG. 1 depicts an example of web pages organized in accordance with an embodiment of the present invention. For the purposes of this application, web pages are referred to as "plots" and the sheet as the "landscape sheet." As shown in FIG. 1, plots 102 (web pages) are placed spatially on a two-dimensional landscape sheet 103 (a small portion of which is visible is the depiction of the user's display screen in FIG. 1). Owners of each plot may self-select the placement of the size and location of their plot 102 on the sheet 103. It should be noted that in other embodiments of the present invention, the placement of a plot may be determined by the system operator. The plots may be abutted against each other or separated from each other in the sheet by negative space 104, analogous to the streets and landmarks of a city.

Presence

Figure 1B:
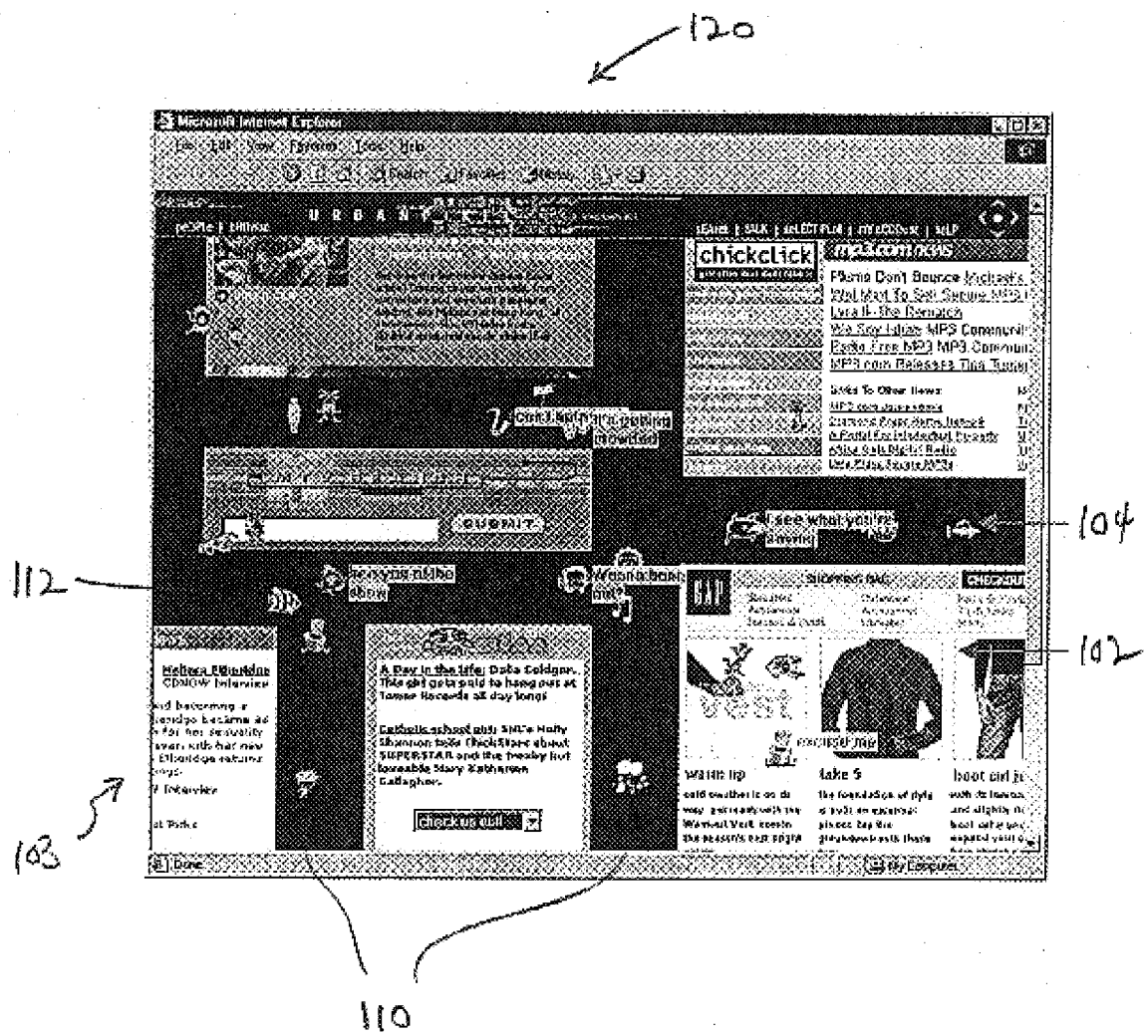

Another feature of a browsing environment in accordance with an embodiment of the present invention is the representation of each user as a graphical character or "proxy" located in the two-dimensional landscape. In one embodiment, the system enables users to create their own proxies. FIG. 1B illustrates an example of an area in the landscape sheet combined with a community of users browsing that area. Users, represented by proxies 110, chat as they browse and shop. Users can send messages in the context of the space by posting text to their proxies. Users view everyone else who is browsing in their current browsing neighborhood (e.g., that portion of the sheet that is visible on the user's display screen). While browsing (spatially) within an area, users are able to see other users' proxies browsing close by and get a sense of crowd and community. This technique provides a mechanism to combine people within the browsing context. Each user sees the same spatial layout and proxies in their own browser interface 120.

Proxies can have automatic behaviors set by their owners that give them a sense of being alive and aware. For example, if a user (its proxy) gets too close to a shy proxy, then the shy proxy would move away. If a user moves through a street, a staring proxy would follow it with its gaze. These features may be implemented in software in ways well known to those of skill in the art. As described in more detail below, users can also message to other users by chatting to their corresponding proxies. Unlike systems which integrate chat within a document, users can chat anywhere within the landscape, positioned on top of a plot or in the negative spaces in between plots. The messages may appear in a text box 112 adjacent to the proxy of the user sending the message, and/or may appear in a chronological log form elsewhere on the page. As described further below, the messages may be visible to all users in the user's area (analogous to neighborhood) (analogous to speaking aloud), or may be directed only to one or more specific users in the area (analogous to whispering). The neighborhood level is very similar to online chat rooms. However, because of the surrounding HTML, there is a sense of context. Since users browsing and chatting are together in one common spatial space, it is expected that the browsing experience will be improved for all users.

Persona

In some embodiments, the system also provides for users developing a "persona" as they establish a personal history associated with their presence over time. That is, each user maintains a personal account which accompanies them as they browse the space. Each account can hold information relating to the user including: proxy character, self-published information, references they've collected from others, a currency account, etc. This feature enables responsible users to command respect as they engage in e-commerce transactions, host events such as garage sales or simply chat to other users. Similarly, it limits the destructive abilities of rash users. For privacy reasons, the system may also be configured to allow users to turn off their persona (i.e., render it inaccessible to other users).

NAVIGATION

Figure 2A:
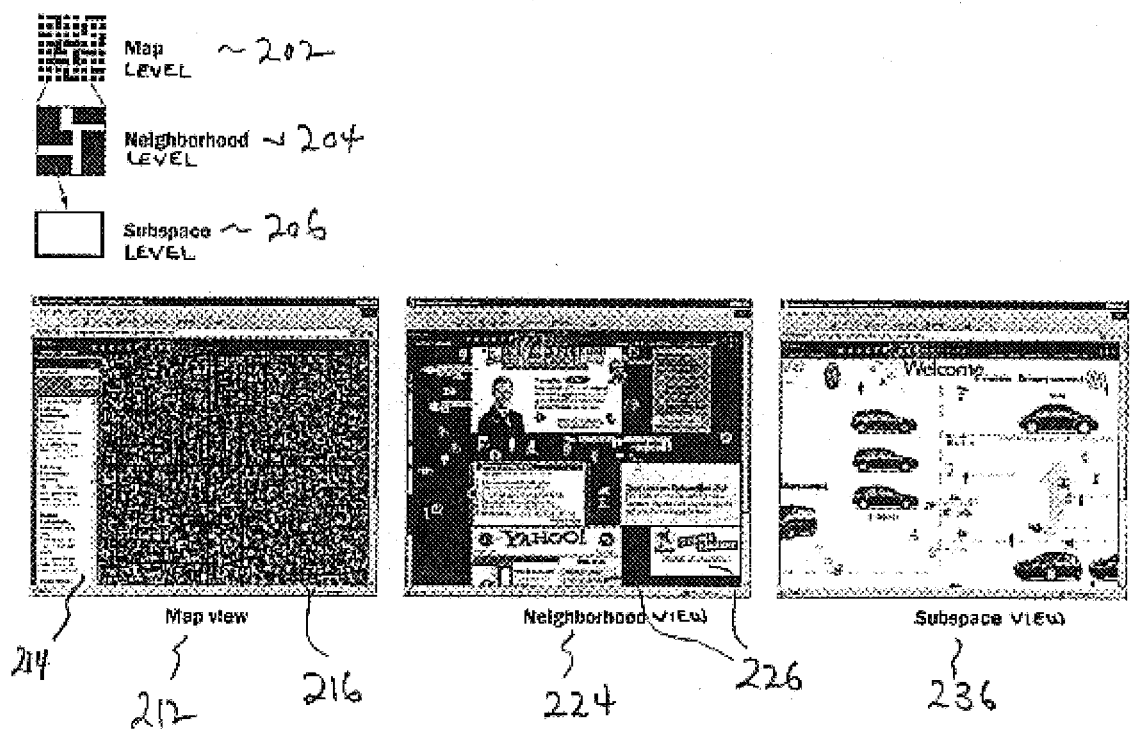
FIG. 2A illustrates a multi-level browsing concept in accordance with an embodiment of the present invention.

A system in accordance with the present invention may provide multiple levels of browsing to facilitate orientation and navigation within the landscape sheet. In one embodiment, the system supports a zooming mechanism, as described and exemplified with reference to FIG. 2A. FIG. 2A illustrates the multi-level browsing concept. At a map level 202, a birds-eye map view 212 of the system space (landscape) is displayed in the user's viewing window, in which the HTML plots are spatially represented as blocks, possibly in color. Keeping with the city analogy, these plots correspond to a view of city buildings and stores as seen from a flying plane.

Users can search the system space (landscape) by typing in keywords as search criteria in a field provided in a user interface screen. The map level view 212 shows an example screen of a search. In addition to displaying the search results as a list of links 214, a map 216 of the system space is also displayed with the result plots matching the search criteria highlighted in the space. At the map level users move as if flying over the landscape sheet. Aggregate users gathered together can be seen as dots in the neighborhood. The map allows users to visualize the various neighborhoods and their activity and see the larger context in which they are located.

As a user browses within an area of interest, the user may zoom down to a neighborhood level 204 by clicking on an area of the map 214. This level 204 presents a spatial layout of HTML plots and streets (negative space) as well as the proxies browsing in the area. At the neighborhood level 204, the user may have a presence in the vicinity amongst other users who are browsing nearby. In the neighborhood view 224 the HTML plots 226 are bigger and contain information that is more detailed. These plots 226 correspond to the outside windows of city stores and the front of buildings. Users navigate within the space analogous to walking in city streets. In one embodiment, there is a one-to-one mapping between the map level and the neighborhood level, and users can switch between levels at any time. The navigation model, based on contextual overviews combined with the spatial layout, makes it easy for users to find their way around in an otherwise complicated information space.

In addition to these two levels, users can click on a plot 226 and zoom down to enter into its associated web site. Within a given web site level, the user is in a private space and below any level of organization of that site relative to others. This level is referred to herein as subspace level 206. At subspace level, the user may navigate an individual web site according to its own internal organization. The subspace view 236 shows an example of an individual site.

It is also possible that individual private web sites may be organized according to principles of the present invention. Sample applications include community-based sales. For example, merchandise at a retail web site may be represented by images separated by negative space representing aisles in a store. The individual web site can layout their online store spatially and place complementary products near each other to take advantage of spillover traffic as users move from one area to another. Users visiting the site may then be represented by their personas and may be able to interact as at the neighborhood level. A retail site can provide customer service represented in the form of a proxy to help users with their shopping needs in the context of the merchandise. In addition, the site can have sales staff "on the floor" cross selling products and reaching multiple customers at the same time.

Figure 2B:
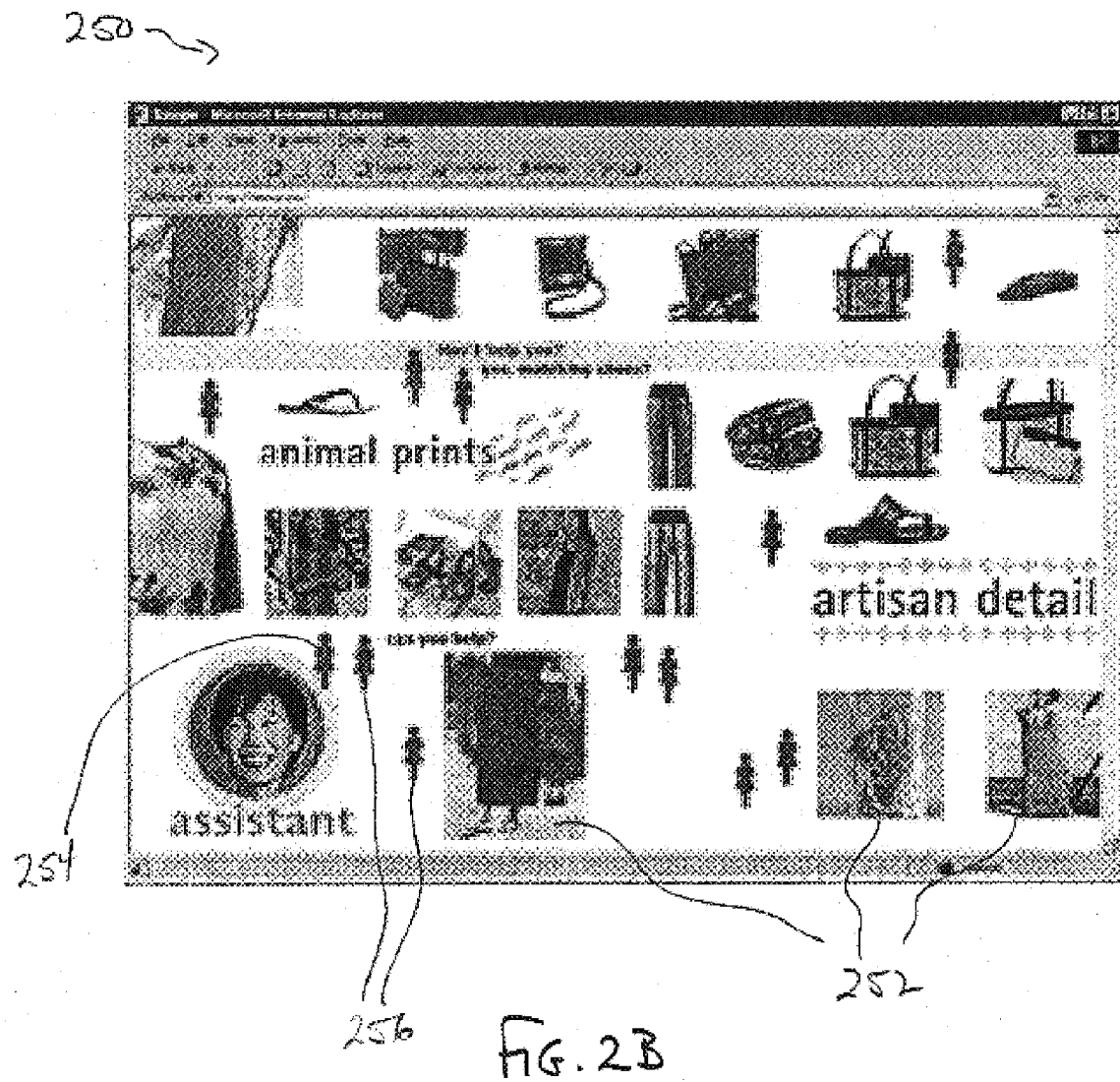
FIG. 2B illustrates an example of an individual web site (subspace) organized in accordance with the present invention.

FIG. 2B illustrates an example of an individual web site (subspace) organized in accordance with the present invention. The figure shows a virtual store 250 for an etailer. Dominant players in this area currently use an online catalog to attract potential buyers. Unfortunately, most catalog browsers do not become customers for a variety of reasons including lack of customer support, lack of online sales people, non-engaging catalog experience, and lack of an adequate "buzz"—the presence of both information and people. The present invention addresses these issues by enabling etailers to create a virtual store similar to the real store where merchandise placement, customer service, friendly sales people and the presence of other shoppers are inherent to the experience. In FIG. 2B, below, the catalog or parts of it 252 are laid out much like a shopping floor in a shopping mall. Sales and customer support people 254 are readily available to help the customers 256 when needed, for example, by communicating with them via a spatial chat mechanism as described herein. Etailers can leverage this spatial map to lay out synergistic content/products, cross-sell and integrate product information in context much like a real store. Additionally, in some embodiments, users can see other users and chat within this spatial context to obtain informal advice and reviews.

Navigation is further facilitated by a panning mechanism that allows a user to bring areas of the landscape sheet that are adjacent to an area being displayed into view. As described in further detail below, using a standard HTML browser, users can navigate by either panning the landscape sheet or using the links within the plots. When users pan through this two-dimensional landscape sheet, the browser retrieves (e.g., using conventional browser technology such as represented by Netscape Navigator™ and Microsoft Internet Explorer™, the organization and operation of which are well known to those of skill in the art. Further details regarding the Netscape and Explorer browsers and their operation may be found on the web sites of their developers at, for example: http://developer.netscape.com; http://www.mozilla.org/docs/; http://www.mozilla.org/roadmap.html; http://devedge.netscape.com/docs/manuals/index.html?cp=dev01mdoc; http://msdn.microsoft.com/ie/; http://msdn.microsoft.com/ie/default.asp; and http://msdn.microsoft.com/workshop/c-frame.htm?/workshop/browser/default.asp, respectively, the disclosures of which are incorporated by reference herein) the layout and (HTML) plots that are coming into view. This technique gives users the illusion of a very large continuous landscape.

As users keep using this sheet of information it will become a very familiar and stable space where users can look not only for information and entertainment but also for community. Plots are allocated through a self-organizing process similar to real estate markets in which people self-select the location of their plot. By using a market mechanism, it is envisioned that diverse HTML pages attracting similar people may be placed near each other, effectively establishing street-like neighborhoods. This will make it easier for users to locate other people of similar interests.

SYSTEM COMPONENTS AND CHARACTERISTICS

As described above, a computer network interface system in accordance with the present invention offers users a self-organized information landscape providing a spatial context to associate web sites to one another. The system may also provide users with a tangible presence in the company of others within the landscape. The characteristics of the components of the system, and the processes by which they operate in preferred embodiments of the invention are described below.

As described in further detail below, the system exists in a network environment in which client software runs on an individual user's computer. The client communicates with server software over the computer network.

Figure 3:
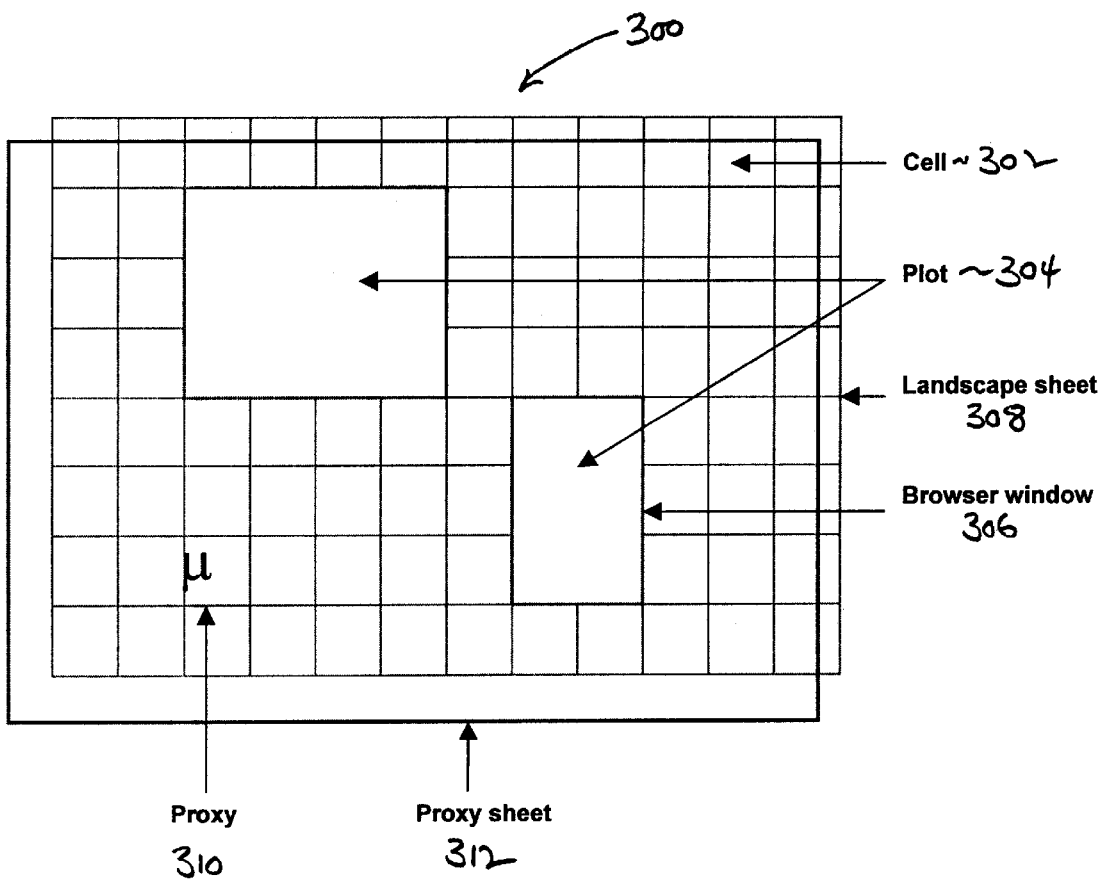
FIG. 3 depicts a representative area of system space that may be displayed in a client viewing window (browser window) illustrating the relationships between principle components of a computer network user interface system in accordance with the present invention.

FIG. 3 depicts a representative area of system space 300 that may be displayed in a client viewing window illustrating the relationships between principle components of a computer network user interface system in accordance with the present invention. A client viewing window presents the area of a landscape sheet being viewed by the client (web browser). The area presented is determined by the size of the client window and the zoom level. As described above, the viewing window can show the landscape sheet at multiple levels of abstraction: map view, neighborhood view, and subspace (web site) view.

Cell

A cell 302 is the smallest indivisible unit of area in the space 300. Cells cannot be created or deleted. They are typically square in shape and their size may be anywhere from a single pixel to a size arbitrarily selected by the system designer. Cell units are used to describe the size of a plot.

Plot

A plot 304 is a collection of contiguous cells 302 that host an application or content. It is created from cells and it can be destroyed. A plot has a minimum size equal to one cell, and is preferably rectangular in shape. A plot is associated with a spatial location in a two-dimensional space, and plots do not overlap one another. A plot cannot be moved or transferred to another location, but it may be resized by increasing or decreasing its collection of cells (i.e., adding or removing adjacent cells (if available) to the plot).

In the operation of a system in accordance with the invention, a plot is assigned to an owner who can set access privileges for the plot. Users can set the content (e.g., HTML) of their plot. A database system stores and manages the content that goes into each plot.

Browser Window

A browser window 306 is an instance of a plot 304 on the client. It is created from the plot and presents the plot's content. The size of the browser window 306 is determined by the size of the plot 304. As long as it is associated with a given plot, a browser window 306 is not resizable or moveable relative to other browser windows unless the plot is resized. A browser window may be transferred to a new plot, which may have a different size, according to user transactions described herein.

The browser window 306 allows a user to interact with the application or content of the plot 304. The system may be configured so that clicking on a link in the plot 304 replaces the content within the browser window 306 of the plot 304. Alternatively, the link can target the parent browser window (i.e., the browser window in which the entire spatial view is displayed), hence replacing the content of the parent window.

Landscape Sheet

A landscape sheet 308 is a two-dimensional virtual sheet that hosts browser windows 306 as defined by plots located on the virtual sheet. The sheet 308 size can vary greatly. For example, it may be as small as about 1200×1200 pixels or smaller, or as large as about 1,000,000×1,000,000 pixels or larger. The sheet cannot be created or deleted.

Browser windows 306 are spatially positioned on the sheet 308 according to their plot 304 locations. Browser windows 306 can be abutted next to each other on the sheet 308 or there can be negative space between them. As described in more detail below, the landscape sheet data may be held by a single server, or it can be divided among multiple servers, each server maintaining an area of the sheet.

In some embodiments of the invention, areas of the landscape sheet may be assigned degrees of access, either by the system operator or by system users. This introduces the concept of private property into the system. A plot owner, or group of plot owners in a given area of the landscape sheet may designate specific users or categories or classes of users who will be permitted access their plot(s) and/or surrounding area. Undesignated users will not be able to access (e.g., pan into) that area.

Process: Building a Landscape Sheet

Plots 304 are allocated through a self-organizing process in which the plot's owner selects its position in the landscape sheet 308. In one embodiment, plots may also be leased based on a market mechanism. Users are able to buy and sell the rights to lease a plot using a form of system-based currency. The value of the plot depends on the value set by the market's desire for that plot.

Various types of plots may exist, analogous building-types in a cityscape. For example, some plots may be designated as "landmarks" and have negative space on all four sides of the plot (e.g., no other plot abuts to its sides). Other (normal) plots may be abutted on one or more sides by other plots. Still other plots in the system space may be designated as public plazas where users can interact in a public but non commercial context. Streets represented as plots can be more descriptive to help users navigate the space. Street name and direction provides location context in a given region. The space may also include plots that represent billboards which may be rented to advertisers and information centers with information such as local maps. Landmarks, major streets (represented as negative space or as plots), and other features may be created either by the system designer, or may be designated through a voting process by users.

Process: Plot Selection and Transfer

In one embodiment of the invention, plots may be selected using a plot selection window in which the region around the user's proxy is displayed as a grid of cells dividing the landscape sheet. A plot is created by selecting contiguous cells on the grid. The cells will typically form a rectangular shape. A plot must be at least one cell unit, but the system designer may arbitrarily set a minimum size for a plot, such as, for example, two cells. In one embodiment, a system in accordance with the present invention may prescribe rules help to interject negative spaces between plots. For example: Rule 1: A new plot cannot block street access to existing plots, and rule 2: Each plot must have negative space on at least one of its sides.

Plot size is determined by the ability of owner to pay for its lease using a system-based currency. System currency may be acquired by payment of funds to establish a system-based currency account with the system operator, as described more fully below. Ownership of a plot is recorded in the system once the amount of system-currency due for the selected plot is successfully debited from the user's system-currency account. In some embodiments, user's are entitled to purchase as many plots as they would like, thus providing the possibility of multiple storefronts for a given store.

Since system users are permitted to select any available location for a plot they are purchasing, the system enables the user to attempt to position his or her plot to increase traffic to their plot by taking advantage of spillover from the existing plots of successful businesses or other high traffic areas. This is another way in which the spatial organization of the browsing environment analogizes to real life urban environments.

The plot owner is typically responsible for setting the plot content. Therefore the owner must submit content (e.g., HTML) to be displayed within the plot.

Process: Accounting and Rights

The system supports an accounting system based on a "pixel" currency. Initially, the value of a unit of pixel currency (referred to herein as a "PixelPoint") corresponds to a physical pixel in the landscape sheet. Users can purchase a plot size equivalent to the number of PixelPoints used to purchase it. For example, 10,000 PixelPoints can purchase a lease for a 100×100 square pixel plot. As the system evolves, the market determines the value of PixelPoints based on factors such as size and location of the plot. For example, a plot in a desirable location may cost more than a similar size plot in a sparsely inhabited location in the landscape.

Users can purchase PixelPoints with actual currency (e.g., U.S. dollars). Each registered user has an account in the system which keeps track of the PixelPoints they've collected. PixelPoints can be used as the currency mechanism for payment in the system. For example, PixelPoints can be use as payment for leases on plots and access to HTML pages or events.

Process: Search

Users can search for plots by typing in keywords as criteria into a search entry window provided in a user interface screen. As illustrated in FIG. 2, plots matching the search criteria are displayed as a list of links as well as highlighted plots on a map of the landscape. On the map display, the brightness of each plot represents how closely it matches the criteria. Plots are indexed by their meta-tags and content (e.g., HTML).

Proxy

A proxy is a visual (character) representation that may be chosen by the user to portray the user in the system. Referring to FIG. 3, a proxy 310 can be any common displayable file format, including a scripted program. The proxy is dynamically located in the region the user is viewing. Upon a user entering the system, its proxy data is sent to each client browsing the same area as the user.

Proxies do not overlap each other. A user can choose to make his/her proxy visible or invisible. A user can grab and drag its proxy on screen to change its position. A visual representation of the proxy can have a concept of a "frontal" direction, for example, a proxy may re-orient to face the direction it is moving toward.

As noted above, proxies can be animated and have scripted behaviors. They can receive and respond to messages from the user and other proxies. For example, a proxy moving close to a "shy" proxy sends a message of proximity to the shy proxy which triggers an automatic response to move away.

In addition to representing the user, proxies can be used in a variety of other applications within the system context. For example, proxies may be used to enable a richer e-commerce experience (e.g., proxies representing salespeople for merchants located in the neighborhood that the user is browsing), or proxies may be within a browsing environment as advisors (e.g., to ask for recommendation for or directions to particular sites). In addition proxies may represent a system user at real-time events in a multi-user environment, for example, online auctions. Also, proxy information can be collected to provide aggregate user profiles for targeted advertising

Process: Proxy Selection

Upon entering the system, a user is automatically assigned a default proxy character. A user can personalize their proxy by selecting a different character or uploading their own in the proxy selection window.

Proxy Sheet

The proxy sheet 312 is a geographic collection of proxies on an invisible overlay sheet on top of the landscape sheet 308. A user can see the proxies of other users whose viewing windows overlap the user's viewing window. Proxies are replicated and sent to all clients viewing the same region of the landscape sheet 308. Their positions are updated periodically to provide clients with synchronized views of the proxy sheet.

A user's proxy 310 is always present within the user's screen. As described further below, as the user pans the viewing window, the proxy moves to stay visible on screen. The proxy sheet data can be divided among multiple servers, each server maintains an area of the sheet 312. Protocols pass along user data as the user navigate from one area to another.

Summary

Given the foregoing, the organizational concepts and components of the system described above may be related in a functional way. Referring to both FIGS. 2 and 3, the user can navigate system space by panning (e.g. left, right, top, bottom) the viewing window over the landscape sheet 308 at each level (i.e., map, neighborhood, etc.). At the neighborhood level 204, a retrieval engine serves the plots' content dynamically as they come into view. As a user pans the landscape sheet 308, all browser windows 306 and proxies 310 move in tandem to give the appearance of scrolling around the landscape sheet 308. Alternatively, users can click on links within a plot 304 to jump to the link's URL.

Instead of panning the landscape sheet 308, users can choose to jump to another region of the landscape by zooming out to the map view 212 and selecting another region to zoom in on. The map view 212 is also used to show the search results in the context of the landscape sheet 308, as illustrated in FIG. 2. In addition to listing the result set of URLs, plots matching the search criteria are highlighted in the map view 212 of the landscape sheet 308.

Aggregate Profiling

The present invention also provides for a system configured to provide aggregate profiling of users based on traffic patterns. Information on the path that a user takes in the browsing landscape may be aggregated to form a profile of that user. The profile may be useful in targeting marketing information to the user, or information that would facilitate or otherwise enhance the user's experience of the browsing environment.

SPATIAL CHAT

Systems in accordance with the present invention provide an opportunity for innovative user interaction features adapted to the spatially organized context of the browsing environment. For example, the graphical representation of users as proxies on a landscape sheet in a viewer window, as described above, provides a forum for communication (messaging) between user browsing the same space.

Thus, in a preferred embodiment of the present invention, the system is configured so that users are able to communicate to other users in their vicinity by sending messages. Message data can include the text of a message, information on a proxy associated with (sending) the message, and all display information pertaining to the text. Messages may be displayed geographically near their associated proxies, and replicated to all clients whose proxies are located in the vicinity of the message sender's proxy. A current message may be displayed near its associated proxy for a set duration or until a next message is sent by the proxy, after which the messages may be displayed in a scrolling transcription of the conversations.

Users can also send whisper messages to each other. Only users involved in the whisper conversation are sent the actual text message. To others not privy to the conversation, the text messages appear in an abstracted form. To these clients, the system may send "greeking" text (nonsense text) to visually show a private conversation taking place without showing the actual text of the message.

Process: Messaging

Text messages typed into a message entry window in a user's viewing window are sent to the server. As described in more detail below, a spatial chat messaging engine transmits the message data to all proxy clients in the same geographic vicinity. Users, whose proxies are in the same geographic vicinity, can see the text message displayed next to the sender's proxy. Chatting is not confined to a document; a user's proxy can be positioned on top of a plot or in the negative spaces in between plots. Also, spatial chatting may also take place within a web site (subspace) organized in accordance with the present invention.

Spatial Audio

The system may also be configured to provide for audio emanating from plots, proxies, and groups of people. Each audio source is connected to a spatial location on the landscape sheet. The audio sources are combined and manipulated to give users the illusion of spatialized sound. For example, a user browsing in the area near MTV might hear music played from the MTV plot become louder as they move toward the plot.

Summary

Spatial chat messaging and audio enabled by the spatially organized web browsing systems in accordance with the present invention provides significant advantages over conventional chat room formats currently available. The inventive systems provide a comprehensive solution in which each user has a visual, tangible presence on the web in the company of others. Interaction and communication with other web users, and the experience of web-based information, is possible with an intuitive and natural interface based on familiar spatial organization and social cues from the physical world.

SYSTEM IMPLEMENTATION

The following description provides implementation details sufficient to enable one of skill in the art to practice the present invention. Those of skill in the art will realize that systems in accordance with the present invention may be implemented in other ways using suitable hardware and software tools.

System Architecture

Figure 4:
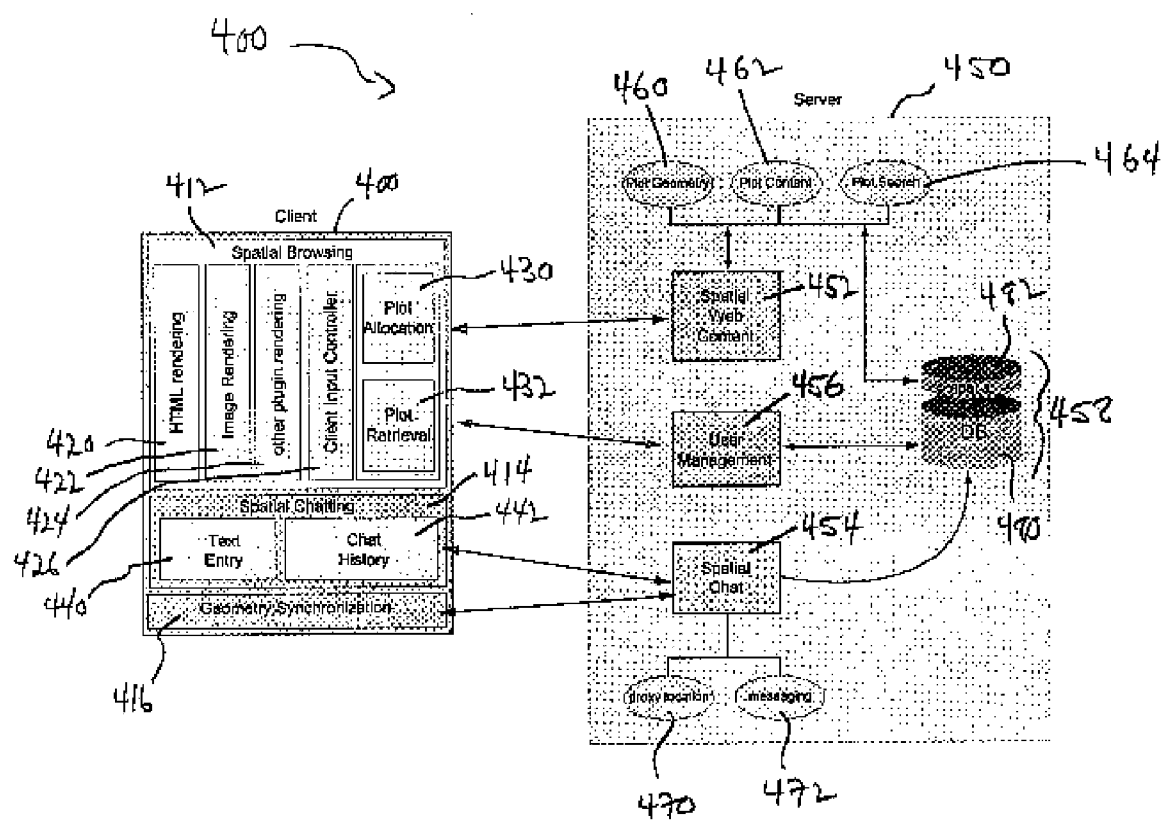
FIG. 4 depicts an example of a system architecture in accordance with one embodiment of the present invention.

FIG. 4 illustrates an architecture suitable for implementing a spatial browsing and chatting system in accordance with one embodiment of the present invention. The system 400 includes client 410 and a server 450. The client 410 and server 450 can communicate using any standard networking protocols that allow arbitrary data to be passed between two computers on a network. Such protocols are well known to those skilled in the art. For example, requests from the client could be transmitted via HTTP.

The server 450 has a spatial web content component 452, a spatial chat component 454, a user management component 456 and a data storage component 458.

The client 410 has a spatial browsing component 412, a spatial chatting component 414 and a geometry synchronization component 416. The client's spatial browsing component 412 includes various plugin engines 424 to render different types of web content e.g., an HTML rendering engine 420 and an image rendering engine 422 for generating the HTML and graphic content to be displayed in the client viewing window. The spatial browsing component 412 also includes a client controller 426, for receiving inputs from a user, for example, through text and/or mouse input and interfacing with the client. Coordination between these engines is supported via a scripting engine 428 in the client's spatial browsing component.

The client's scripting engine 428 is used to implement a plot allocation engine 430 and plot retrieval engine 432. The web content of each plot is retrieved from the spatial web content server 452 and then displayed using the various plugin engines (HTML 420, image 422, etc.)

The client's spatial chat component 414 includes a text entry module 440 and a chat history module 442. The text entry module 440 allows the user to enter, format and direct messages to any, all or a subset of users. The chat history module 442 keeps a log of the messages sent and received by the client. The client's geometry synchronization component 416 manages the position of the user's proxy as well as tracking the positions of other proxies in the user's neighborhood. The position information of the user is sent to the spatial chat server 454 and the position information of other proxies in the neighborhood are retrieved from the spatial chat server 454. The client's spatial browsing and spatial chat components rely on this geometry information to decide which other proxies should be represented in the neighborhood and correspondingly which ones should get messages.

The server 450 has a spatial web content component 452, a user management component 456, a spatial chat component 454, and a data store component 458. The spatial web content component of the server 452 contains modules to manage the geometry of plots within landscape 460, to manage the web content of plots 462, and to search for plots based on location or content 464. These modules of the server use the data store component 458 of the server to manage the spatial (plot geometries) and non-spatial (plot title, PixelPoint cost, web content, etc.) data. This server component 452 responds to geometry based queries (returns which plots lie in a particular area of the landscape) as well as standard queries (returns the web content for a particular plot).

The spatial chat component of the server 454 contains a proxy position (location) manager 470 and a messaging engine 472. The proxy position manager 470 tracks proxy positions from various spatial chat clients and relays this position data to the appropriate set of clients that are in the neighborhood. Clients use the messaging engine 472 to send messages to any, all or a subset of users. These sub-components can optionally log various data about the client's position and messages to gather aggregate roaming profiles and to support archival viewing of conversations. The position and message data are archived by the data store component of the server 458.

The user management component 456 of the server manages various data about the user, such as name, password, email address, proxy type, proxy content (if any), PixelPoint balance, optional buddy list and optional marketing/demographic data. The data managed by this server component 456 is stored in the data store component of the server 458.

The data store component of the server 458 allows other components of the server to manage data with and without geometric references. It has two sub-components: a normal (scalar) data store 480, a geometric data store 482. The normal data store 480 supports data retrieval via a normal scalar SQL query. The geometric data store supports geometry based queries for data that has been stored with geometric references.

As will be apparent to one of skill in the art, it should be understood that this architecture is applicable to the implementation of all aspects of the present invention, and this system can be replicated to support any individual web site (subspace) organized in accordance with the present invention. The features of this architecture and their operation in the implementation of systems in accordance with the present invention are described in further detail below. Of course, one of skill in the art will recognize that although the system shown in FIG. 4 is one preferred architecture of the present invention, it is by no means the only architecture on which the present invention can be implemented. The system may be implemented using other architectures effective for accomplishing the features and operation of the system as described herein.

Regardless of the architecture, a system in accordance with the present invention may employ one or more memories or memory configured to store program instructions for the operations described herein. Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Client

Browsing the Landscape

The client component of a spatial browsing system in accordance with the present invention runs on an individual user's computer, as a separate application, such as a standard web browser, Java applet or custom software application. It communicates with the server software using the computer network and standard protocols. The client component retrieves and renders the stored landscape and proxies and allows navigation within the landscape. It also provides for the transmission and reception of messages between proxies in the same geographic vicinity.

The user starts with an initial position in the landscape. This position may be specified directly by the user, it may come from a hypertext link, or it may come from the server itself. The client reports this position to the server and requests the data representing the plots found in the vicinity of the specified position. The size of the vicinity is determined by the size of the client viewing window and the zoom level. The data returned includes the location and size of each plot, an identifier, and details about the contents of the plots. The plot contents are described by a layout description language understood by the client, such as HTML, XML/XSL, RSS, plain text or other common file format.

The client handles each plot returned individually. Each plot is rendered as an independent layer within the client application using a standard system for rendering the layout format specified. The layer is positioned and sized according to the data returned by the server. As the layers are overlaid, each plot fills in the space on the screen assigned to it, resulting in the illusion of a continuous landscape.

The user may navigate within this space by panning or using links within the plots. As the user pans in the space (i.e., moves up, down, left or right), the layers are moved in tandem to give the appearance of scrolling around the landscape sheet. At the same time, the client reports the new user position to the server, and the server returns data corresponding to any new plots that are coming into view. These new plots are rendered in the same way as the original plots.

Clicking on links within the plots can take the user to a new position, new landscape or a standard web page. Each link is a standard URL; however, if the server specified by the URL is a system server, the link may contain additional information about the position in the landscape to jump to, or a new landscape stored in the server. Changing the position within the landscape will cause the user to be "transported" to the new position and the client will request and render the plots for the new position. Going to a new landscape may be perceived as going into a "private space" associated with the original plot. This linking system allows for an infinite hierarchy of linked spaces.

Proxies and messages are handled in a similar manner as the plots. The user's position is reported to the server along with a request for the proxies or messages. For proxies, the server returns an identifier for each proxy in the vicinity of the user, along with its position and the address or data of a visual representation of the proxy. The visual representation can be any common graphic or displayable file format, such as a bitmap graphic file, a Flash or Shockwave file, a Java applet, a vector graphic file, or text. It may also include information for animating the proxy or handling certain events in the system. The client displays each proxy at the position specified, using the display information, in a layer above the plots.

Message data includes the text of the message, any additional information to stylize the text (fonts, size, color, graphics) and the identifier of the proxy that the message is associated with. It may also include xml, html and macros as descriptions of the message. The client matches the messages with the proxies and displays the message next to the proxy. As the user moves around the landscape, the server is requeried and returns the new positions of the proxies (if they have been moved), new messages, and any new proxies that appear in the specified area.

At all times, the client has the final control over how the plot, proxy and message information is displayed. The display may be affected by user settings, the capabilities of the client software, hardware or system, and/or the current status of the client (zoom level, window size, etc).

Plot and Proxy Selection

Plots and proxies are selected using the client application as well. Using the normal browsing process for the landscape, the user can see which areas are not currently occupied by other plots. The client may also specifically ask the server to display areas of the landscape which may be used for plots but are currently unallocated. To claim an area of the landscape, the user marks an unallocated area, supplies display information for the area, and then the client sends this data along with the user identification information to the server. If approved, the server records this information and the display information is sent back to each client who is browsing the area. The server may have to validate the request based on whether the user has permission or enough "credit" (e.g., "PixelPoints", as discussed above) in a system-based account to acquire the space.

Likewise, when a user first joins the system, the user selects his or her visual representation within the space, to be displayed as the "proxy". The server associates this representation with the user and sends this data to each client who is browsing the same area as the user.

Plot Rendering Engine

This embodiment of the present invention is implemented using an HTML rendering engine. The HTML rendering engine has a scalable architecture and encompasses several techniques that are important to its performance, including dynamic loading of plot HTML, buffering of HTML layers, layer swapping, and anticipated panning.

Dynamic loading of the plot HTML optimizes network usage and client performance by only loading data needed to display plots in the immediate view area. The client initially only requests the data associated with plots in the vicinity of the existing view. As the user pans to new areas of the landscape, the client makes additional requests to the server to load information about plots coming into view.

Buffering of HTML layers is important for high performance navigation and to overcome conventional browser limitations. The rendering engine pre-allocates a maximum number, N, of HTML layers for rendering the plots. The number N has to be greater than the maximum viewable plots on the screen at any given time to ensure that there is a surplus of layers which acts as a buffer.

Figure 5A:
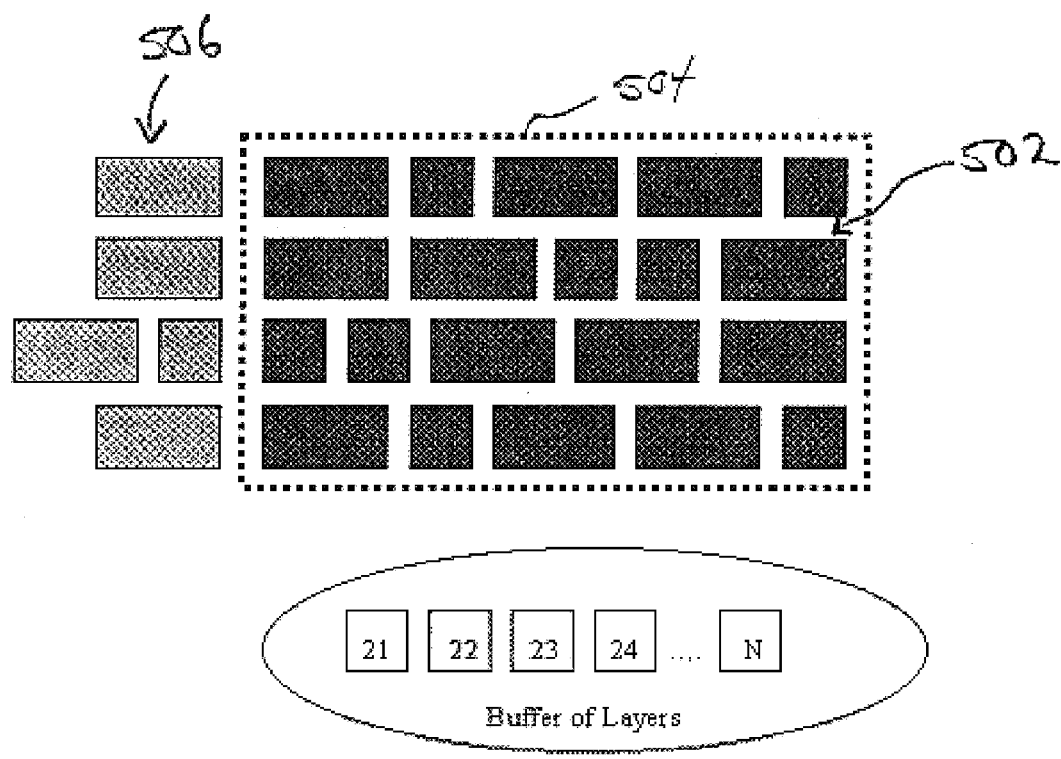
FIGS. 5A and 5B, illustrate panning and buffering mechanisms associated with navigation of the landscape in accordance with one embodiment of the present invention.
Figure 5B:
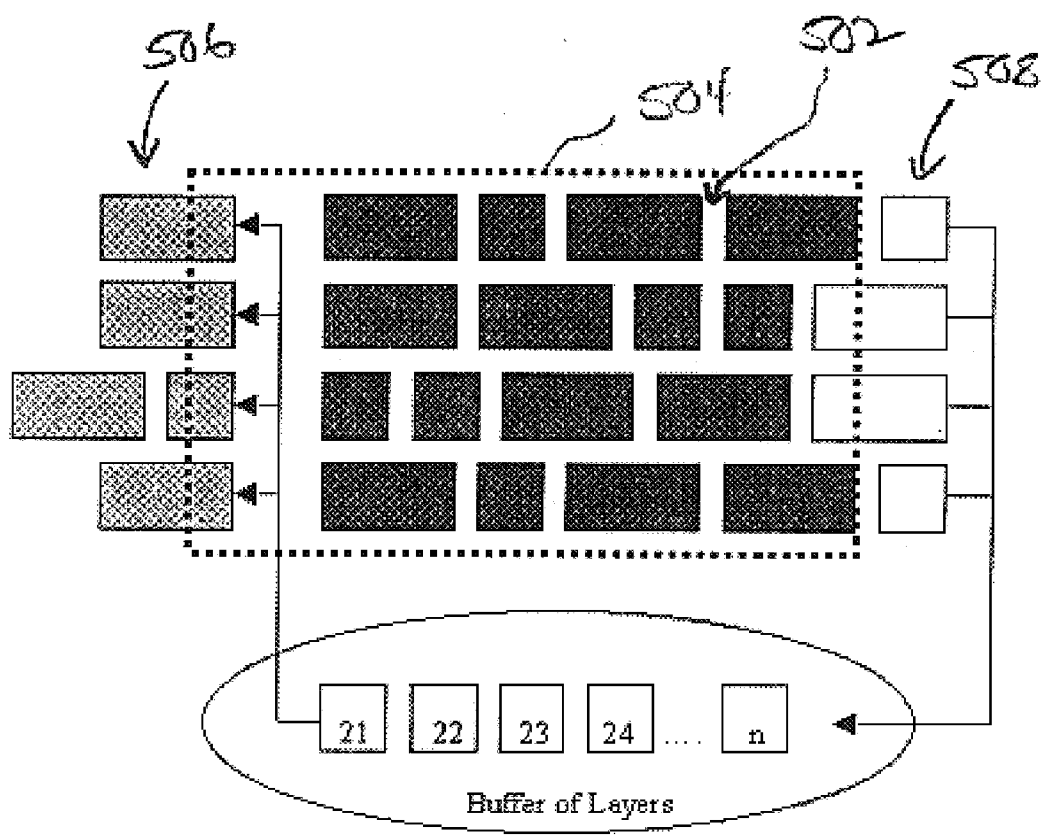

The layers that are not utilized for immediate display of plots make up the buffer. For example, FIG. 5A, displays twenty plots 502 that are within the viewing window 504 of the users screen. Five additional plots 506 are outside (to the left) of the viewing window 504. Layers 21, 22, 23, 24 . . . N, are excess layers that are available to the rendering engine for additional plot display. FIG. 5B, shows the panning and buffering mechanisms in action. As the user pans to the left, the plots 506 to the left of the original twenty 502 come into view in the user's viewing window 504. In order to render these plots, the rendering engine will use up layers currently free in the buffer. Simultaneously, it swaps out layers that are falling off the right edge of the screen. These layers are recycled back to the buffer for further use. This layer swapping technique, between layers in the buffer and the screen is important to achieving high performance and scalability.

This technique may be facilitated by anticipated panning. Anticipated panning is an optimization technique that reduces the frequency of polling necessary to retrieve plots from the server. The rendering engine anticipates that the user will pan in one of the four directions (left, right, top, bottom) and pre-fetches the plots that reside in these neighborhoods. As such, when the user actually pans to these neighborhoods, the plots are already available for display.

Server

A spatial browsing system server in accordance with the present invention performs the following functions: user authentication—validation of end-users; user management—registration, deletion, buddy list management, and proxy management; plot storage—spatial definition and contents; plot management—creation, destruction and re-definition; plot retrieval—retrieval of plot definitions and/or contents based on spatial queries; proxy storage—spatial definition and contents—proxy tracking; proxy retrieval—retrieval of proxy definitions and/or contents based on spatial queries; and messaging—Message storage, forwarding and deletion.

User Authentication

In implementations including this function, the server will only respond to clients that represent authenticated users. A server-client session is defined as a series of requests and responses from the client to the server until either party terminates the exchange. The first server response in all sessions, except a new end-user registration request, is always an authentication request to the client. New users registration requests will be honored without authentication.

Sessions cannot proceed unless the client specifies valid credentials (username, password) for the end-user. Once authenticated as a representative of a valid end-user, the client is sent a unique identifier that must be used in every subsequent request from the client until the session is terminated.

User Management

The server will store and manage various data about the end-user. Data for end-users will usually enter the system via new registration requests from the client. These requests will contain the following data: user name, password, email address, proxy, optional buddy list and various optional marketing data. All the data in a new end-user request is text. This type of request will be handled by generating a unique identifier (ID) for the new end-user and using that ID to add the user's data to the data store.

The server will also support deletion of existing users. User deletion requests need only contain the end-user ID. In response to such a request, the server will delete all the data for the corresponding entry in the data store.

The server will support changes to any information about an existing user. End-user data change requests need only be accompanied by the data that is changing.

Proxy Storage

According to this implementation, the server will store static data for proxies, such as the proxy image and size, in a normal data store. This data store can be implemented using standard computerized storage mechanisms: databases, text files etc. Dynamic data for proxies, such as the proxy location, will be stored and managed in real time by the spatial chat engine.

Proxy Tracking

The client submits updates to the proxy position each time it changes. The spatial chat engine is responsible for tracking the new position and forwarding the new location to other clients which may be viewing the proxy. In addition, this information is logged and can be correlated with user demographic information and plot content and keywords. The system can then produce aggregate traffic patterns that match a certain user profile.

Proxy Retrieval

The server will support retrieval of proxy data and position by the client. The client can request either proxy data, geometry or both. Requests can be made using query criteria for any attributes, e.g., return IDs of all proxies that overlap a specific geometry, or return all proxy data for a specific proxy ID.

The client submits requests to the appropriate data store: queries based on geometry will be directed to the spatial chat engine and queries for other data will be sent to the normal data store.

Plot Storage

The server will store data for a plot in two data stores. Plot geometry will be stored in a special geometrically indexed data store. Other plot data will be stored in a normal data store.

Plot Management

The Server allows plots to be created, destroyed and re-defined. Plots are usually created, destroyed or changed based on requests from the client, but may also be done directly by other agents on the server. A plot creation request will contain the following: geometry, title, identifier of the owner, background color and content. All parameters except the content are text. The content can be any data that is viewable in a web browser, including HTML, graphics, plain text. In response to this request, the server will assign the new plot an identifier (ID) and use this ID to create an entry in its data store to hold the plot's title, owner identifier, background color and content. The plot's geometry is stored in a special geometrically indexed data store.

A plot deletion request will only contain the plot ID. In response to such a request, the server will delete all the data for the corresponding entry in both regular and geometric data stores.

A plot re-definition request will allows the client to change any of a plots attributes, hence the request only needs to contain new values for the geometry, title, owner identifier, background color or content. Attributes that are not being changed need not be specified in the re-definition request.

Plot Retrieval

The server will support retrieval of plot data by the client. The client can request any subset of plot data using query criteria for any of a plot's attributes, e.g., return IDs of all plots that overlap a specific geometry or return all plot data for a specific plot ID.

The server will redirect these queries to the appropriate data store: queries based on plot geometry will be directed to the geometrically indexed data store and queries for other plot data will be sent to the normal data store. The results of the separate queries are re-assembled, if necessary, and sent back to the client.

Messaging

The spatial chat engine will relay messages immediately on behalf of a client. These messages can be directed to a specific end-user, a set of end-users, or to all other end-users within a specified geometry. If the intended recipient is not currently connected to the system, the server will store the message in a chronologically indexed data store. Undelivered messages are then forwarded to their recipients on a periodic basis. Messages are not restricted to text. They can include positioning information or URLs which enable synchronization of multiple users' browsers.

Scalability

Figure 6A:
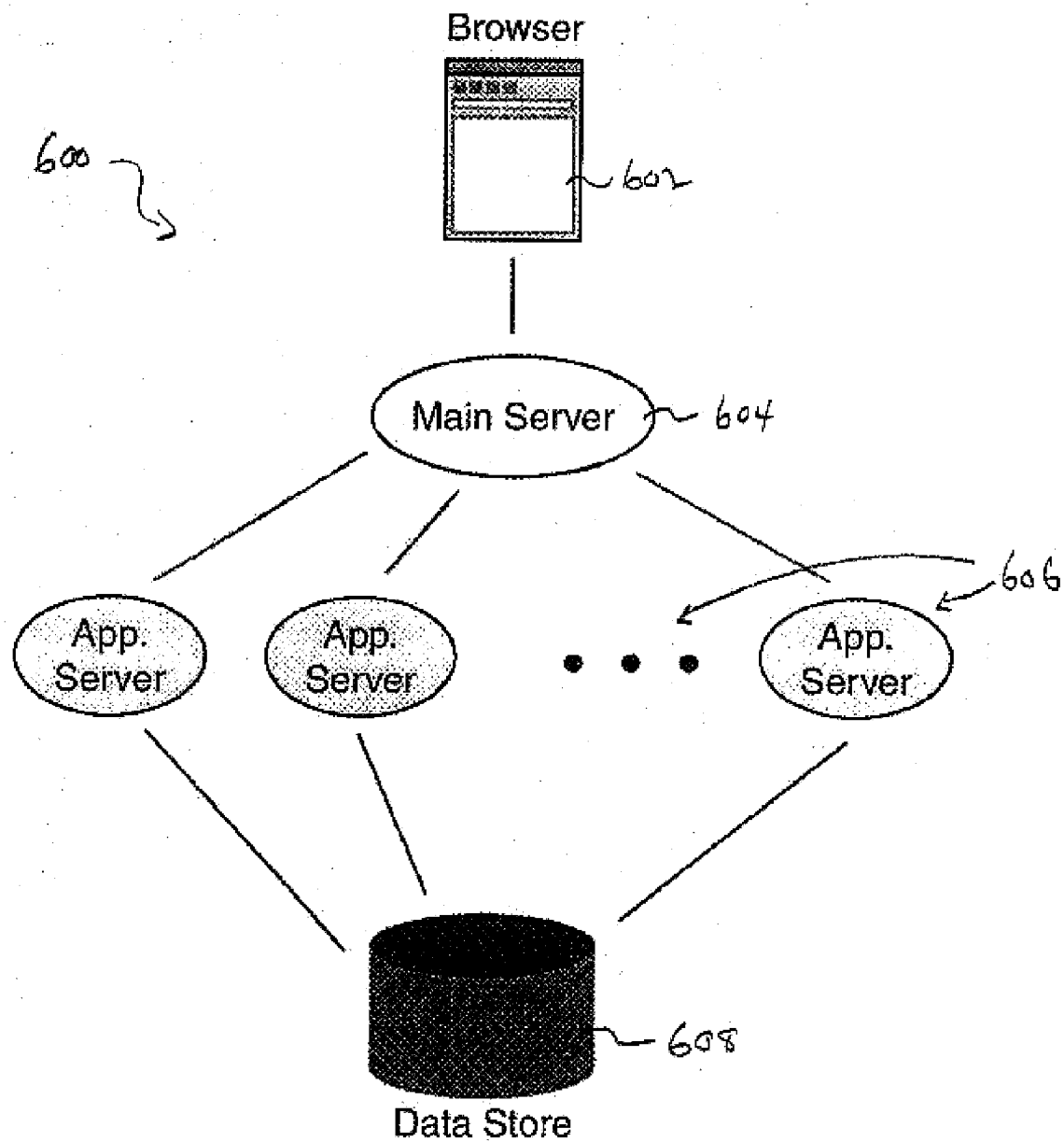
FIGS. 6A–C illustrate various layering techniques implemented in the architecture of embodiments of the present invention in order to optimize performance and scalability.

Performance and scalability may be achieved using various layered techniques. As illustrated in FIG. 6A, the first layer of the architecture 600 provides for having multiple servers 606 accessing a single set of data stores 608. Requests received from client browsers 602 are re-routed from a well-known server 604 to any of the mirror servers 606 based on a round-robin scheme.

Figure 6B:
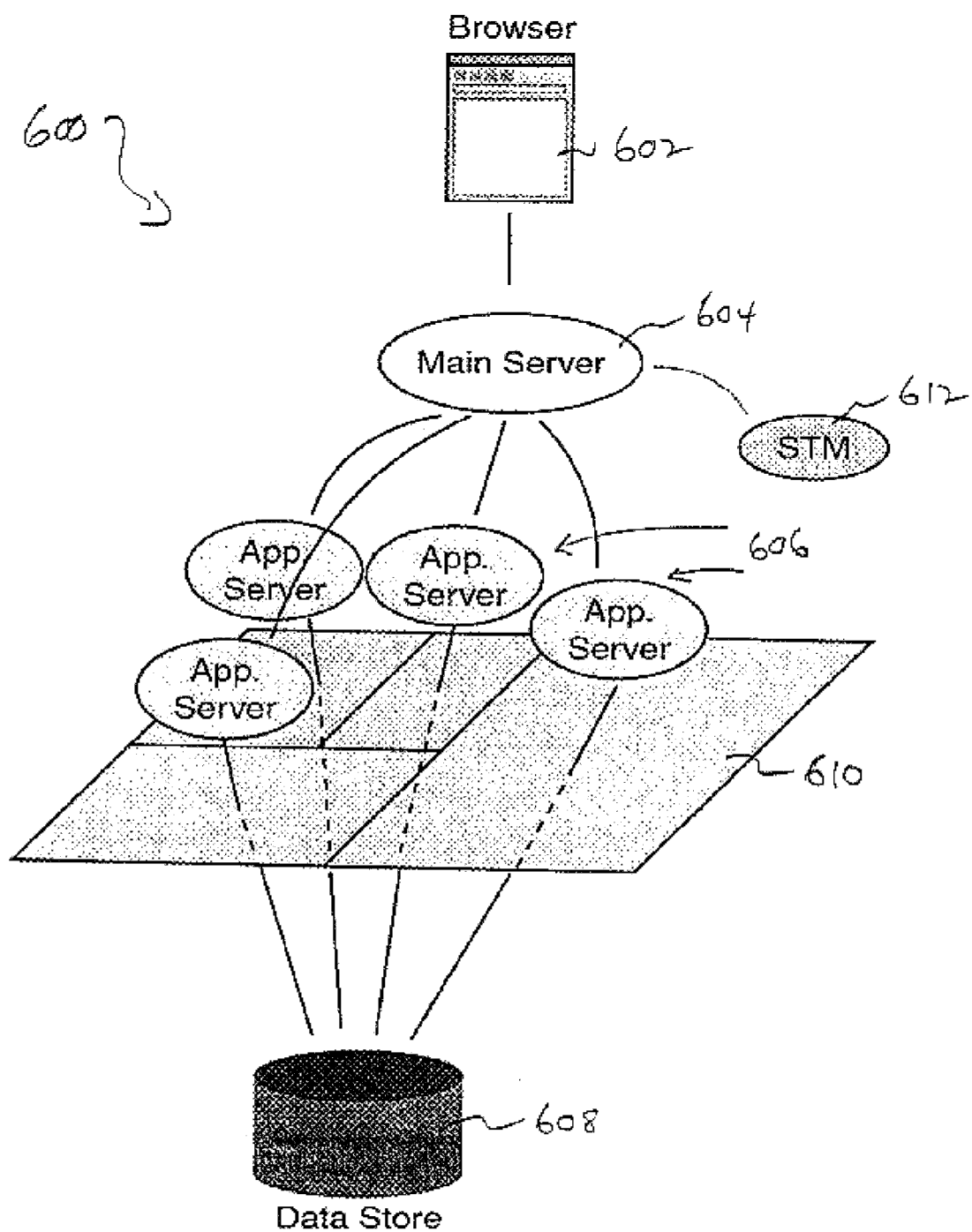

The second layer of scalability adds spatial assignment and a Spatial Transaction Monitor (STM) to the architecture. As illustrated in FIG. 6B, the landscape 610 is sub-divided among all the servers 606 and the STM 612 is used to track server utilization. The division is periodically re-evaluated based on server utilization, i.e., more servers will be assigned to a busier area of the landscape. Therefore, requests from clients 602 are re-routed from a well-known server 604 to mirror servers 606 based on the location of the client in the landscape 610 and on server utilization.

Figure 6C:
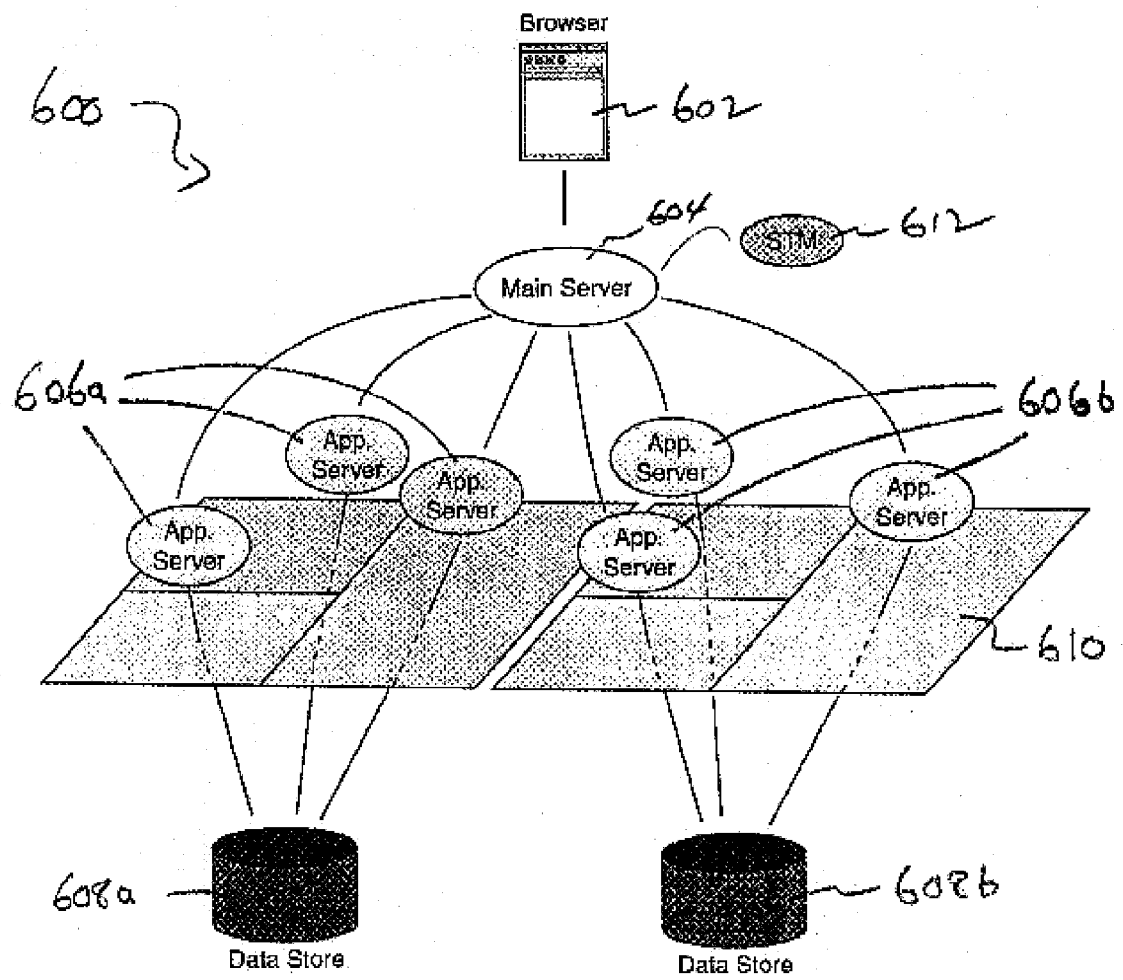

The third layer adds multiple data stores to the architecture. As illustrated in FIG. 6C, the landscape 612 is subdivided among multiple servers 606a, 606b and among multiple data stores 608a, 608b. This technique adds another degree parallelism to the architecture, which ensures better performance and scalability as landscapes get larger.

Spatial Chat Engine

Chat in a spatial context requires a system enabling users in a continuous two-dimensional space to chat with only whomever is in the vicinity of the user. As the user moves around the space, some users enter the vicinity while others drop out. Additionally, even if the user is staying in one place, other users may be moving towards or away from the user. In one possible implementation, each user could broadcast messages to all other users throughout the space, while displaying only those messages which originate within an area around the user. However, this would involve a huge amount of message data to send and receive from all other users if there are thousands or millions of users spread throughout the space.

Thus, a preferred implementation provides a solution which gives the appearance of a single, seamless space, while limiting the data traffic to only messages from other users within some proximity to the user. It works for an arbitrarily large space, with an arbitrarily large number of users, and an arbitrary distribution of users. It manages the messages in such a way that users may always have two-way communication; that is, if one user can send a message to another user, the second user can also send messages back to the first.

Figure 7A:
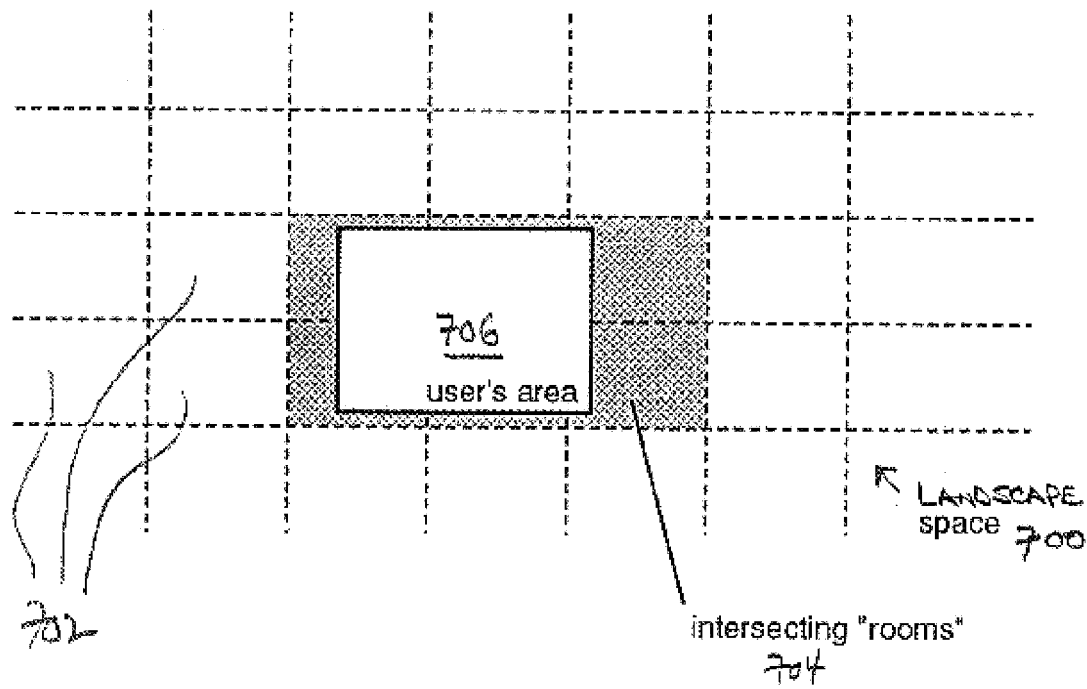

As shown in FIG. 7A, the landscape space 700 is divided into sections 702 at regular intervals (for example, a fixed-size grid along the lines of the cells that make up the smallest landscape sheet unit may be used for this purpose as well; but the space can also be divided into any interval that can be computed predictably, for example, a logarithmic scale may be used for this purpose). These sections 702 are the virtual "rooms" for chatting.

Next, the area of interest 706 around each particular user is defined. This can be based on the visible area of the user's browser or screen, a fixed radius around the user, a fixed-size rectangle around the user, etc. At each point in time, the user is included in the "rooms" (sections) 702 that the user's area 706 intersects. Like a traditional chat room, being included in a room means that messages sent by the user are broadcast to any other users in that room, and messages sent by all other users in the room are sent to the user. Further, if the user's area 706 intersects multiple rooms 702, the user is included in each of those rooms, and thus sends and receives messages to and from all users in all of those rooms.

Thus, as shown in FIG. 7B, user 1 and user 2 are in the same room 720, and so will see each other's messages. User 3, however, is not in any rooms intersecting with rooms occupied by user 1 or user 2, therefore user 3 will not send or receive any messages from users 1 or 2. Messages may include regular chat messages or private messages, information about the user, the location of the user, etc.

The server manages the virtual chat rooms. The client reports the user's location and area of interest as it changes. With this information, the server determines which rooms the user's area intersects and adds the user to those rooms. The user is also removed from any rooms that the user's area no longer intersects. Adding a user sends a message to all other users already in the chat room with the user's ID and location. Removing a user from a room also generates a message to other users so that their client can remove a reference to that user. Messages from each user are sent by the client to the server, and the server handles routing messages to the clients of other users in the same room.

The client receives all messages from the rooms the user's area intersects, but it may filter the messages to show only those originating from the user's area. The number of messages received is a small, finite subset of all the messages in the system, reducing filtering overhead and data traffic. In order to do this, each user's location must be sent to other users as the user's location changes.

Even with this system, the number of users in a particular area may become excessive, either in terms of data traffic or the number of messages that need to be read by the user. The system solves this problem by allocating "levels" within each room as the number of users exceeds some threshold. This threshold may be fixed, to for example 10 users or 20 users, or it may be determined based on other factors, such as the total data traffic, user preferences, or the spatial area of the room. When the threshold is surpassed, a new level is allocated for the chat room and subsequent users entering the room are added to the new level.

Figure 7C:
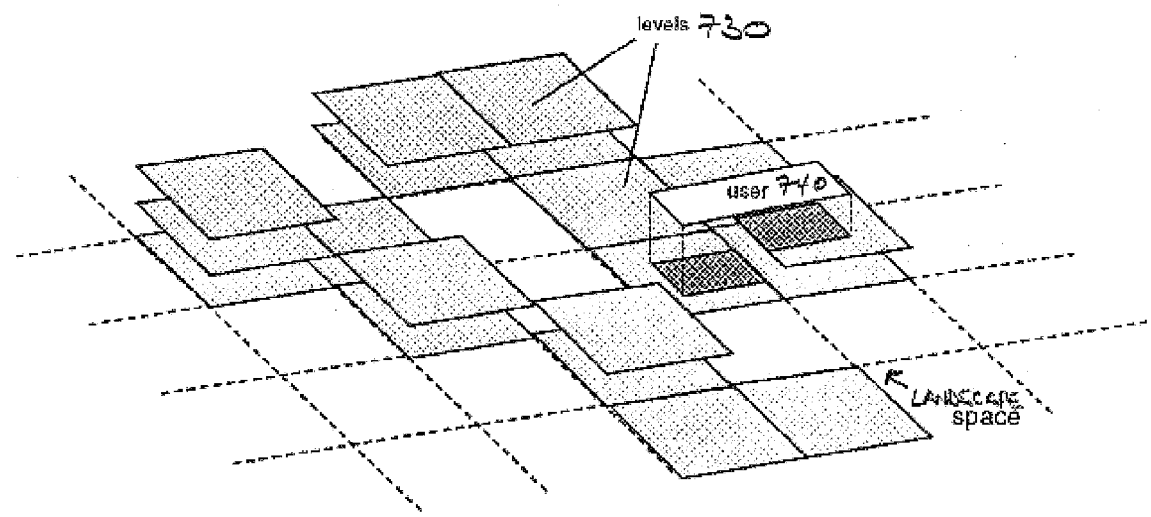

This arrangement is illustrated in FIG. 7C. Each level 730 acts as an independent chat room. Users' messages are broadcast to others within the level, and the user receives all messages from other users at the same level. A user 740 whose area crosses section boundaries may be assigned to rooms at different levels. The user may have the option to change levels, that is, enter another chat room for the same area. The level is unallocated when enough users leave the area; either the system can wait until all users leave a particular level, or it can merge levels when the total number of users in two levels fall below the original threshold.

Screen Shots

The user interface for a system in accordance with the present invention is implemented as a graphical user interface (GUI) that supports the features of the invention described above. An embodiment of this GUI is described below with reference to FIGS. 8A–C.

Figure 8A:
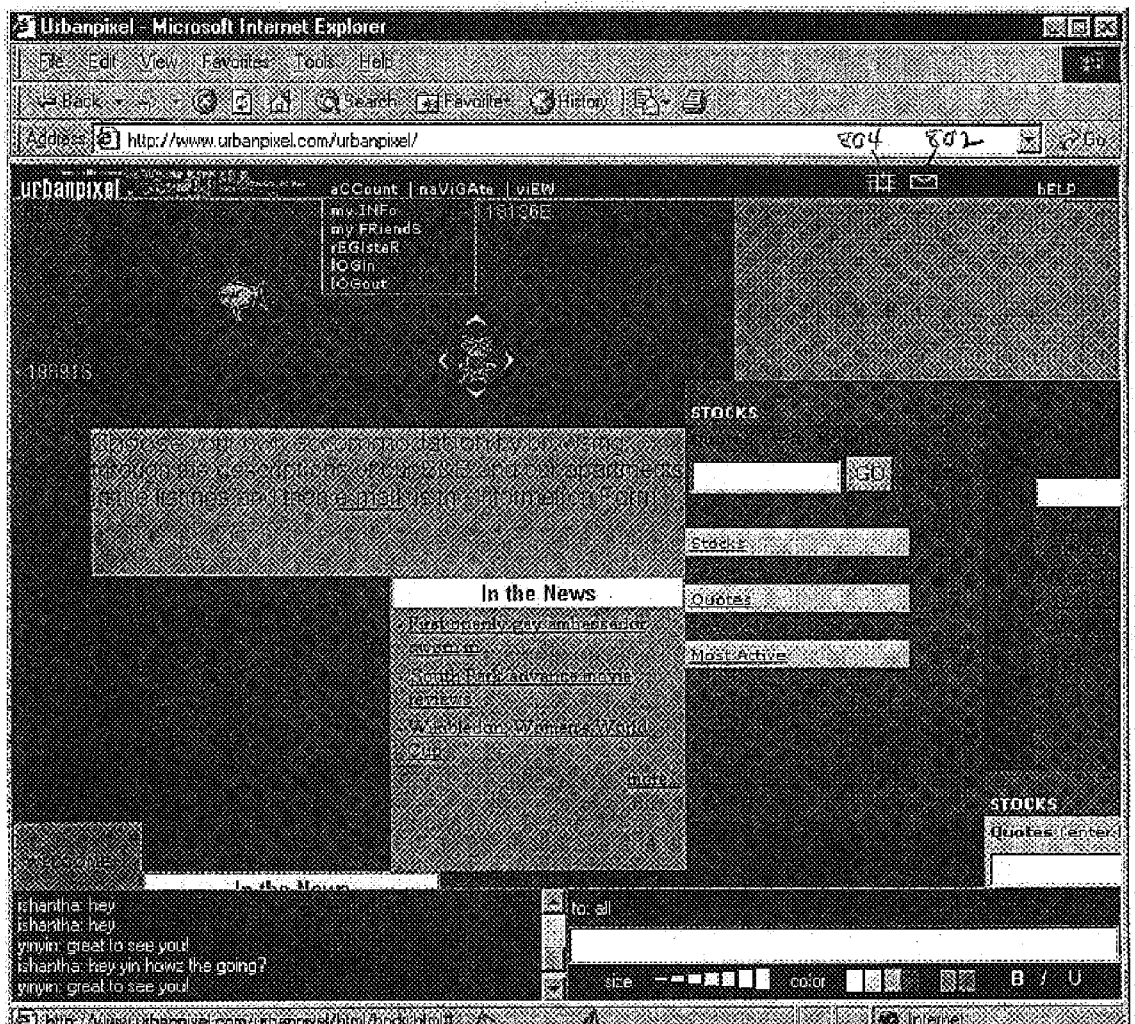

FIG. 8A is a screen shot of GUI in accordance with the present invention. The screen shot is an HTML page displayed in a browser, such as Microsoft Internet Explorer™. It includes a menu bar at the top of the page with the menu items: account, navigate, view, help, and icons for contact the system operator 802 and Plot 804. In the center of the page is displayed a portion of the spatial browser systems landscape sheet, shown at neighborhood view level. At the bottom of the page, in the lower left corner is a text box 806 for displaying chat text between users browsing the displayed portion of the landscape sheet. In the lower right corner is a field 808 for entering text, for example, chat text.

In FIG. 8A, the account menu item has been selected to show its features. The functions invoked by selecting these various features are performed in accordance with the implementation details described above.

Selecting the "My Info" feature brings up the user's profile information in a dialog. It includes the username, real name, e-mail, system currency ("PixelPoints") in the user's account, links to plots the user owns, user's comment, and profile information (e.g., age, favorite music, etc.). Users can edit their personal information, change their password, and determine whether a piece of personal information is for private or public consumption under this menu selection.

Selecting My Friends brings up a list of the user's friends ("buddies"). These friends are in the list because the user has added them to his/her Friends List. In this embodiment, a friend can only be added if the friend agrees to the request. The friends list shows whether a friend is currently logged on to the system. Clicking on a friend's name transports the user's proxy next to the friend's proxy in the system landscape space. Clicking on the user's proxy in the list addresses a private instant message to the friend. Clicking on a friend's home plot transports the user's proxy to the friend's home plot location.

Register brings up a user registration dialog]. The dialog contains user registration fields such as: username, password, email, and default proxy. After registering the user can to personalize their proxy and choose a home plot. In one embodiment, the user can choose to personalize their proxy by choosing from a library proxies, using a tool to generate one by typing in characters (e.g., initials), or uploading a gif to the system.

Login brings up a login dialog so that a user may enter their username and password to log into the system.

Selecting Logout logs the user out of the system.

In FIG. 8B, the navigate menu item has been selected to show its features:

Selecting Mini map brings up a miniature map of the system landscape space. A user can choose to zoom in to a local area (e.g., the area they are currently browsing). In the zoomed in view, the map provides the user with a local view. (e.g., the area they are currently browsing and its immediate surroundings). Clicking on an area of the map transports the user to that location.

Local map brings up a miniature map of the area the user is currently browsing and its immediate surrounding. Clicking on an area of the map transports the user to that location.

Selecting Global map brings up a global map view of the entire system space. A rectangle on the map (representing the portion of the map displayed in the viewing window of the user's browser) shows the user's current location. In addition to a view of the space, relative user density in each area may be displayed as a layer on the map. For example, crowd density may be represented by varying dot sizes over regions on the map. Regions in the system space may also be highlighted with keywords that pertain to the region. For example, topic words (e.g., "health", "finance", "music") may be displayed over each region on the map to give an indication of the content in that region. In addition, a list of the most popular keywords (e.g. "mp3", "britney spears", etc.) of the plots in the space may be displayed, for example, in a window along the right side of the browser. Clicking on a keyword highlights the plots that match the criteria.

Selecting Search brings up a dialog for finding plots in the system space using keywords as the criteria. A ranked order list of plots matching the criteria may be returned with an option to view the results set on a map view. Clicking on a plot name in the list transports the user to the plot's location in the space. Clicking on the map view brings up the "Global" map.

Find person brings up a dialog for finding users in the space. By inputting a username as the criteria, a list of names matching the criteria is displayed. The closest match is displayed at the top with names matching the root word listed below. Clicking on a username transports the user's proxy to that person's location.

Goto location brings up a dialog which allow users to transport their proxy to a specific location based on location coordinates. By inputting an "X" and "Y" coordinate and clicking the "Go" button, the user's proxy jumps to the specified coordinates.

Selecting Follow me invokes a protocol in which a user invites other users to follow him/her as he/she browse the system landscape space. By selecting Follow me, a "Follow me" link invitation is displayed next to the user's proxy. The user can choose to send the invitation as a public invitation or send the invitation only to a specific user or users. In essence, the user who issued the invitation is the leader and as he/she browses, users who accepted the invitation to follow the user (their proxies are moved automatically as the leader moves his/her proxy).

An extension of this feature is co-browsing in which the followers' content updates to mirror the leader's view. This feature allows a group of users to sync their browsing actions thereby enabling the group to see the same content. Followers' content views update to match the leader's view as he/she clicks on links. Similar to the "Follow me" feature, a "Browse with me" menu selection invokes a protocol in which a user can invite other users to sync their browsing actions with those of the leader.

Start conference brings up the "Start conference" dialog which shows a list of the other users currently on the user's screen as well as friends who are currently logged in to the system. Clicking on a user's proxy in the list adds the user to the invited list. Clicking on the "invite" button sends a request to the server to invite users to join the conference. A separate private conference window appears with the user's proxy in the current location context. As invited users join the conference, their proxies appear in the conference window.

Embodiments of the present invention may also include some non-menu navigation features. For example, a user can pan over the landscape by clicking on arrows surrounding the user's proxy. In addition, the user's proxy can be dragged anywhere within the screen with a mouse. Also major streets (boulevards) in the system have a special navigation function wherein if a user drags and drops their proxy on to a boulevard, the proxy pans automatically in the direction specified by the street until the proxy is removed from the boulevard.

Figure 8C:
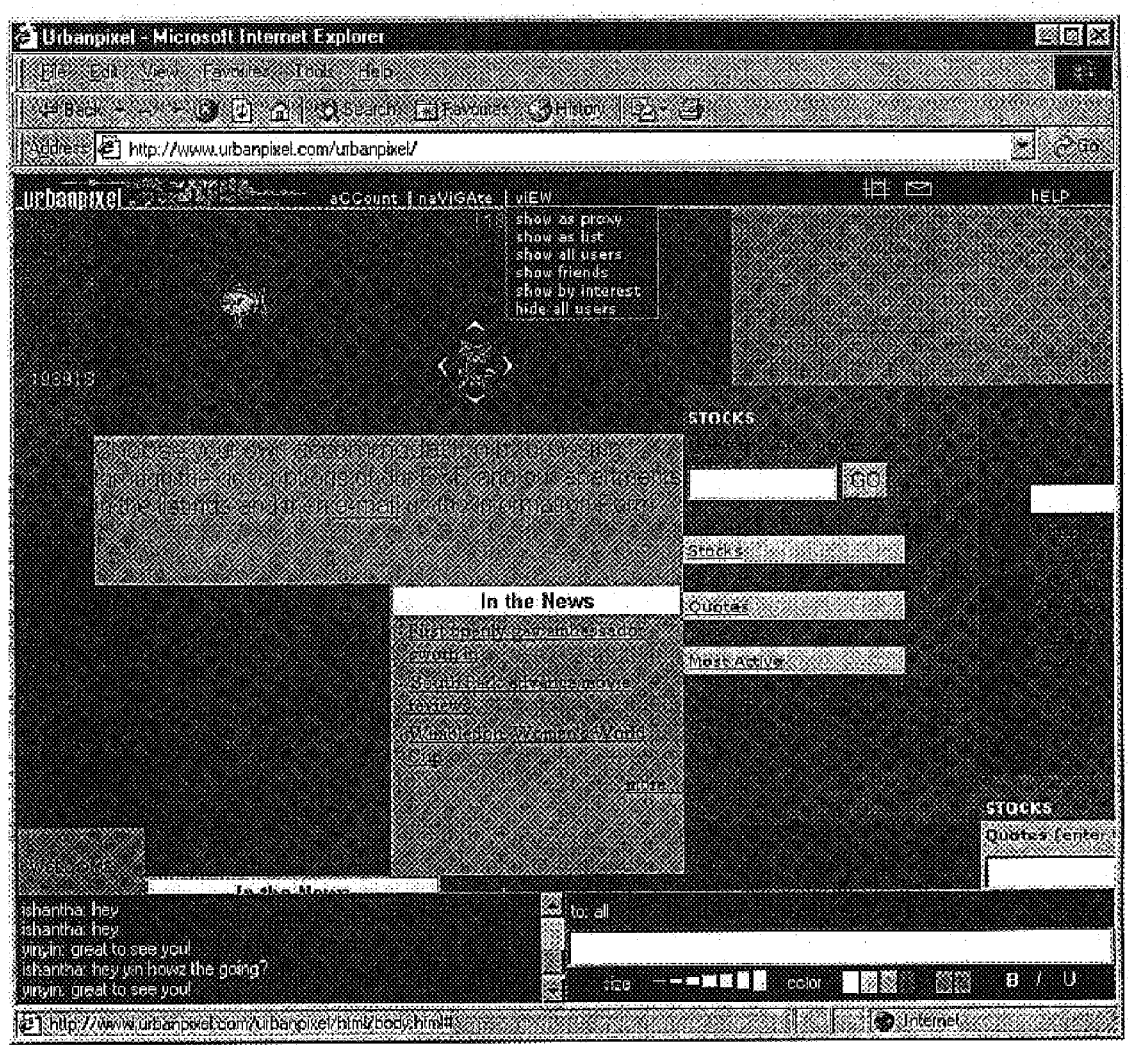

In FIG. 8C, the view menu item has been selected to show its features:

Selecting Show as proxy causes other users located in the region within the user's screen to be displayed as proxies.

Show as list causes other users located in the region within the user's screen to be displayed in a list.

Show all users causes all other proxies located in the region within the user's screen to be displayed.

Show friends causes only friends' (according to the Friends list in the users registration profile) proxies located in the region within the user's screen to be displayed. Other non-friend proxies are hidden.

Show by interest causes only proxies matching user's preference affinities (based on the user's registration information) to be displayed. All other proxies are hidden.

Hide all users cause all other proxies to be hidden except the user's proxy.

The remaining menu bar selections in this implementation include the Help item, and the Plot and email icons. Selecting Help accesses HTML help documentation and/or an e-mail form for help requests. The Plot icon 804 provides two selection options (not shown): Create new plot and View plot info.

The Create new plot icon brings up a cell grid (to indicate plot edit mode) and the "Create new plot" dialog. Clicking on a "cell" selects the cell with dragable handles at the four corners. The plot rectangle is resized by dragging the handles. If the selected plot overlaps an existing plot, the rectangle is colored red and it is not a valid plot. Once a rectangular plot is selected, the "Create new Plot" form fills in the selected plot coordinates (auto filled in), a registration period (there may be a default, e.g., 1 year), and the cost (automatically filled in based on plot size, length of registration and location value). The submitted request is processed, the cost is deducted from the user's account and the plot is registered to the user's account.

The View plot info selection brings up a cell grid (to indicate plot edit mode) and a dialog instructing the user to click on any existing plot to get information on the plot. Clicking on a plot brings up the plot information window which includes: owner username, contact information, comments by the user, "make offer" link. If a plot's owner click on his/her plot, the owner can choose to resize the plot, edit its content, or sell the plot.

EXAMPLES

The following examples describe and illustrate by way of screen shots scenarios illustrating aspects and features of specific implementations in accordance with the present invention. It should be understood the following is representative only, and that the invention is not limited by the detail set forth in these examples.

Scenario 1: Public Chat

Figure 9A:
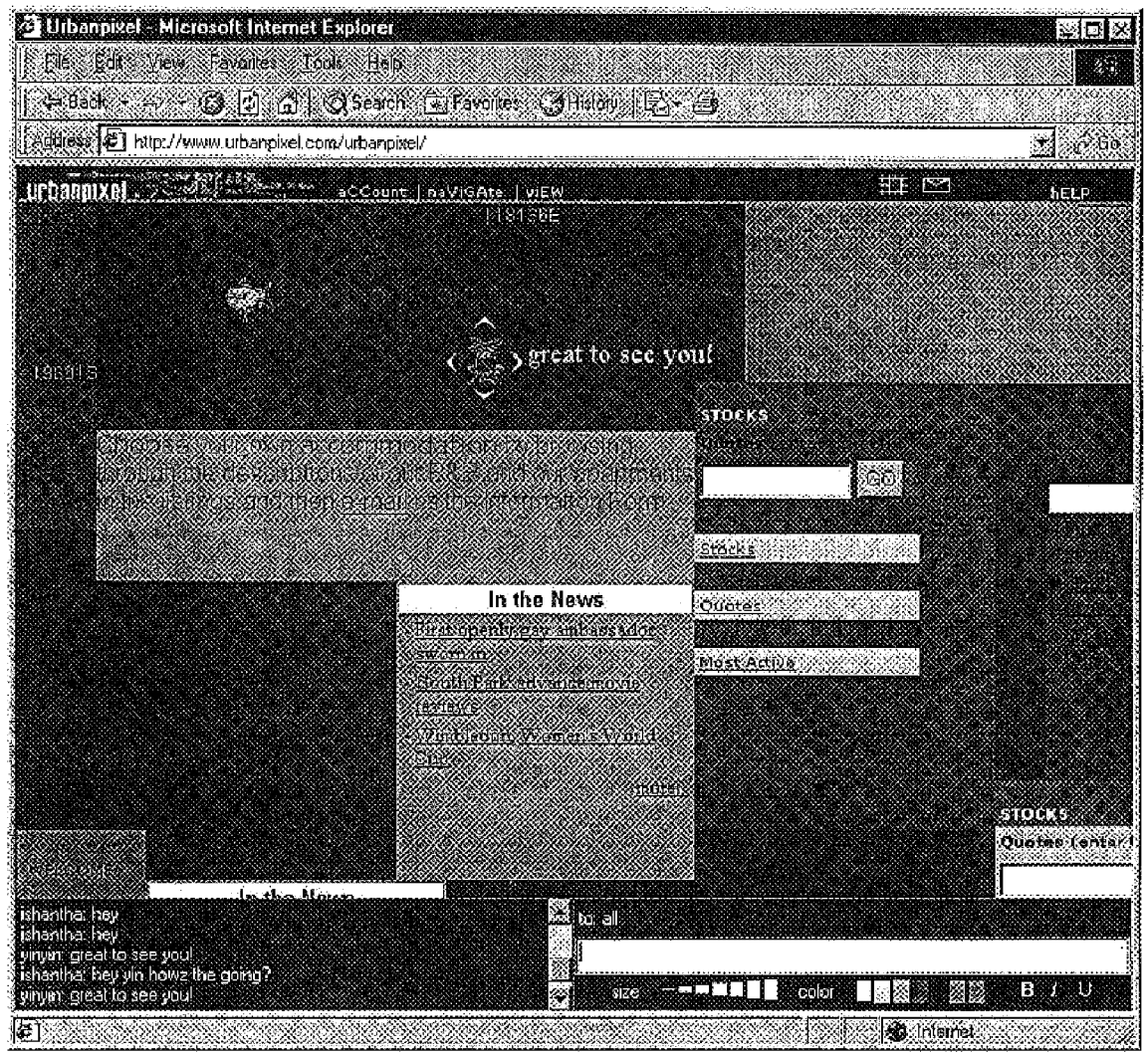
FIGS. 9A–M depict screen shots and other graphics illustrating, by way of example, features of systems in accordance with the present invention.

As shown in FIG. 9A, users can chat with proxies visible on their screen by sending a public message. Using the chat tool at the bottom, the user types a message in the text field and hits the return key to send the message. The message appears next to the user's proxy as well as in the log on the left side of the chat tool. Messages can be made more expressive by varying type size, color and style.

Scenario 2: View Profile Information

Figure 9B:
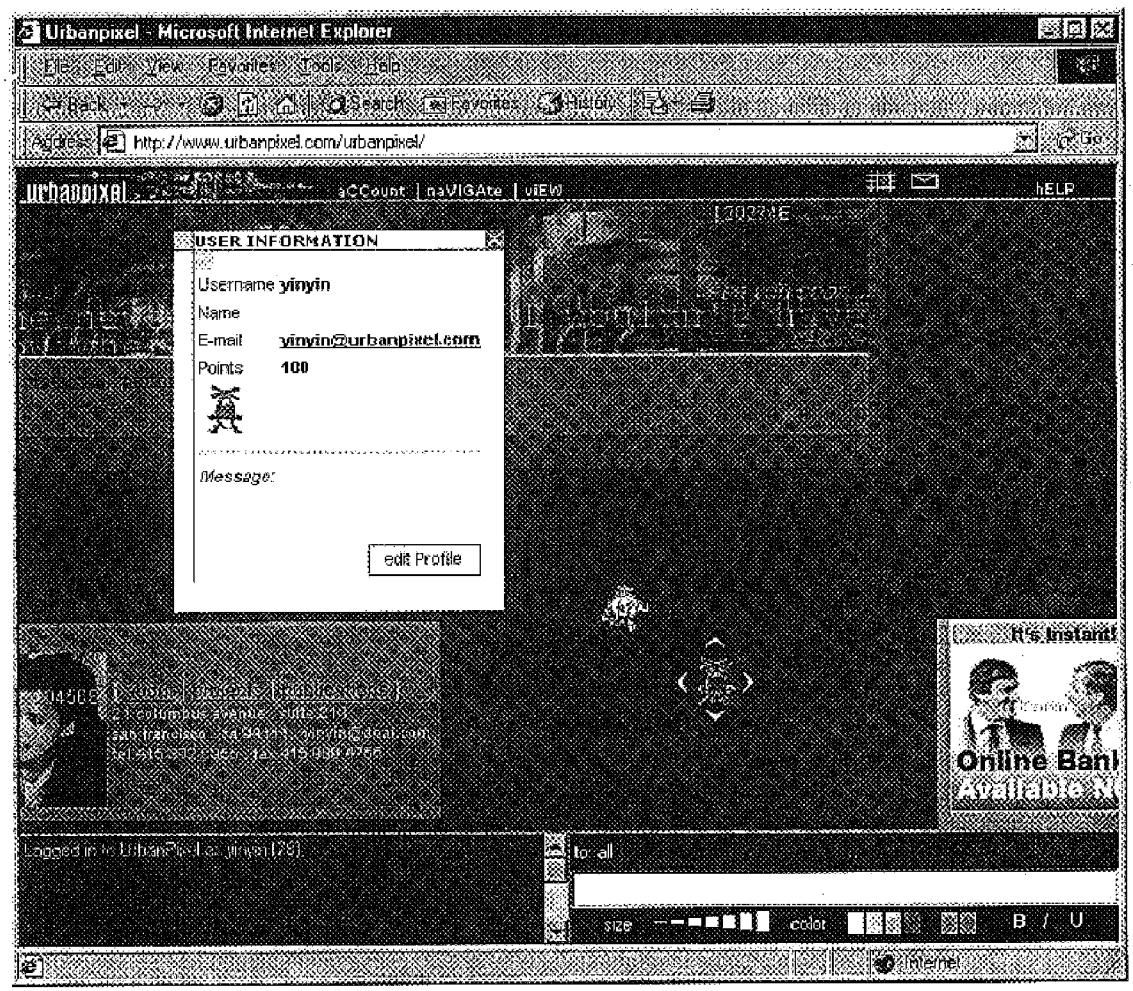

As shown in FIG. 9B, once a user is registered, they can access their own profile information. Information may include the username, real name, e-mail, PixelPoints system currency, proxy, plots, message. Users can edit their profile (e.g. change their proxy, make certain information for private view only, etc.)

Scenario 3: View Profile Information of Other Users

Figure 9C:
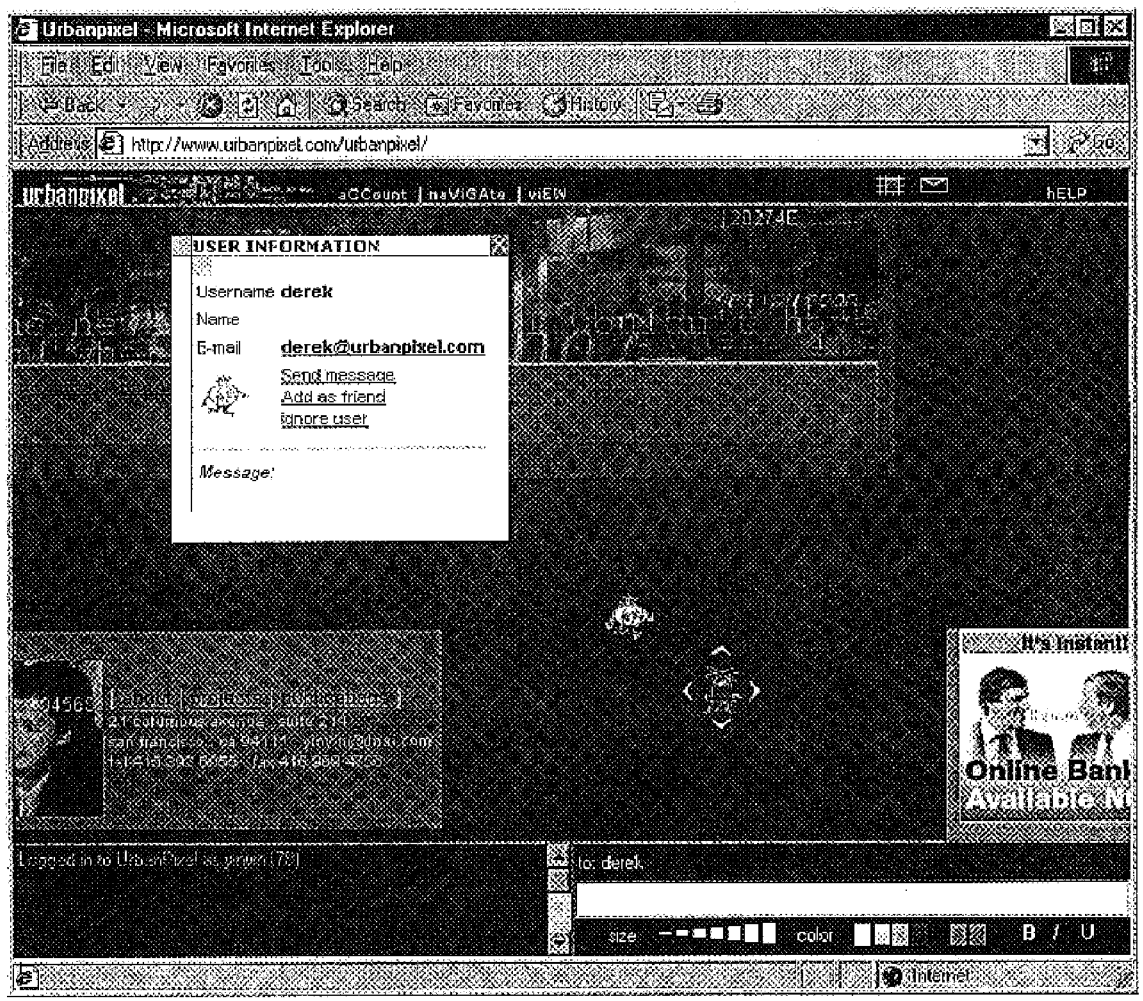

As shown in FIG. 9C, a user can see other proxy's public profile information by clicking on their proxy. A user can choose to send a private message by clicking on the link and typing a message in the chat tool. The message is addressed to the proxy and appears only on the proxy's screen. Clicking on the "Ignore user" link turns off that proxy's presence and representation on the user's screen. Clicking on the "Add as friend" adds the proxy to the user's friends list.

Scenario 4: Registration

Figure 9D:
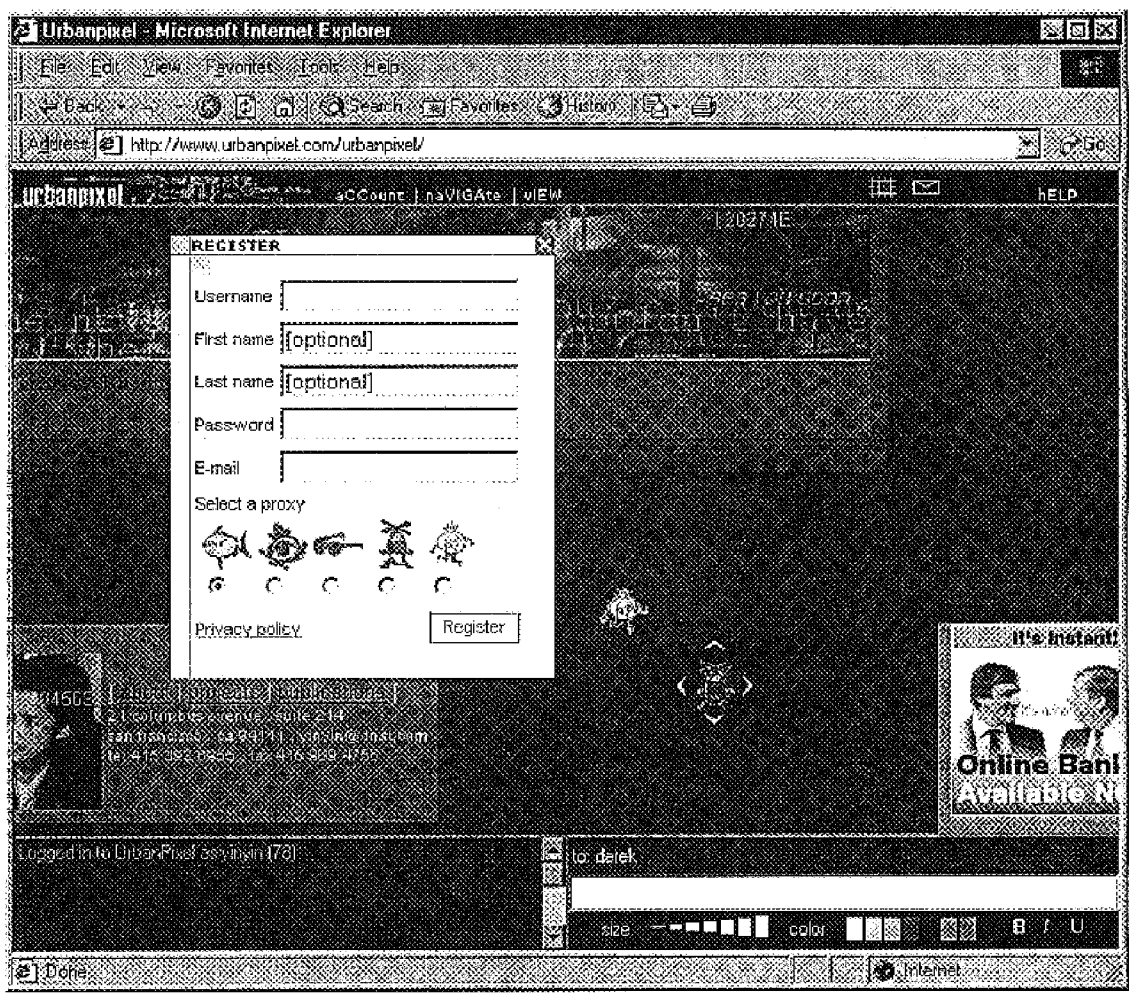

As shown in FIG. 9D, a user can register with the system. As a bonus for registering, the user is automatically given enough PixelPoints to purchase a plot in the system. Users can earn extra PixelPoints for each user they invite and joins the system. By registering, users can accumulate PixelPoints in their account, personalize their proxy, own plots and be a citizen in the system.

Scenario 5: Friends List

Figure 9E:
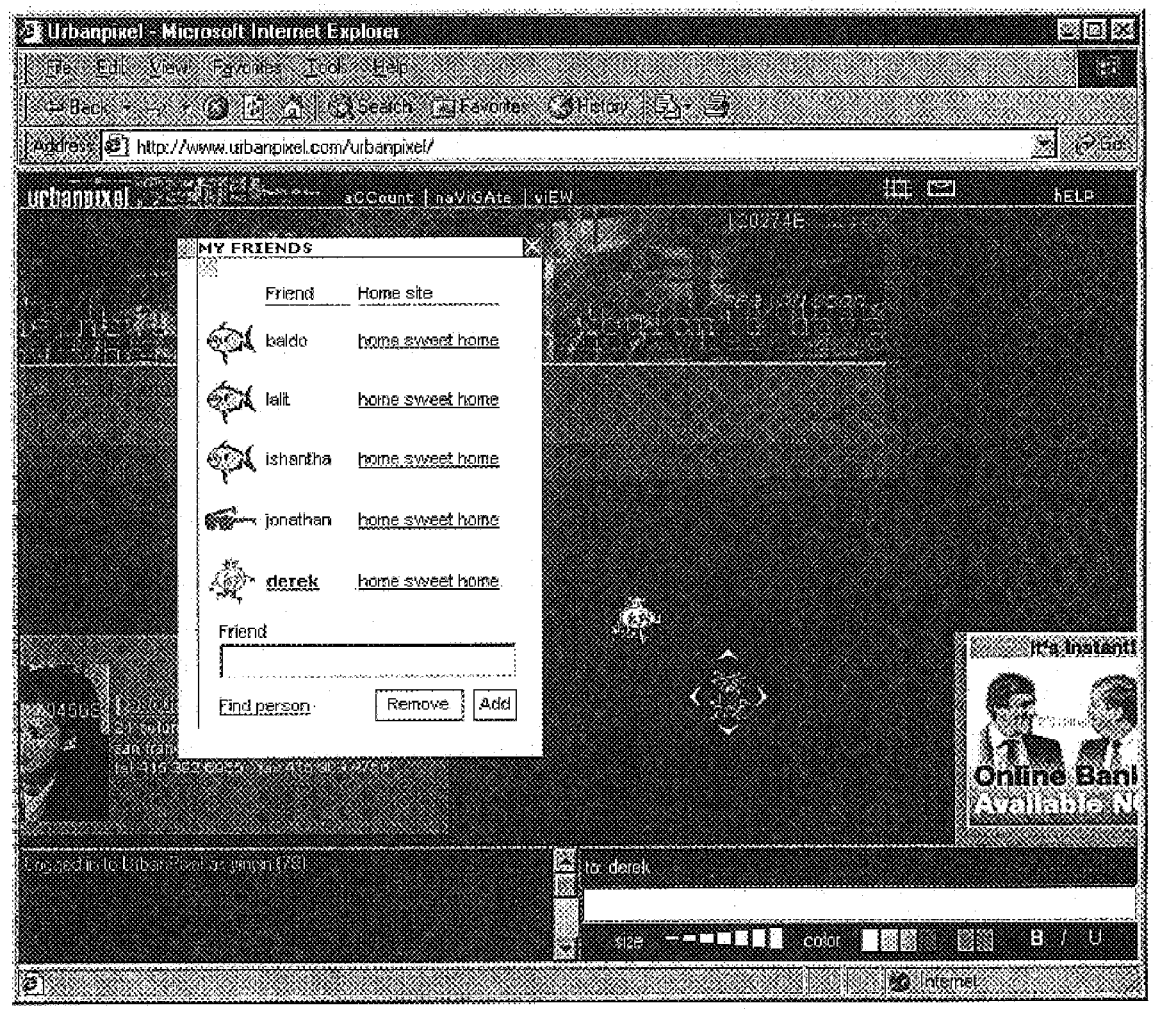

As shown in FIG. 9E, users can create a list of friends they can access easily. In this example, a friend can only be added if the friend agrees to the request. The list allows the user to quickly send friends an instant message as well as jump to a friend's location when they are online.

Scenario 6: Find person

Figure 9F:
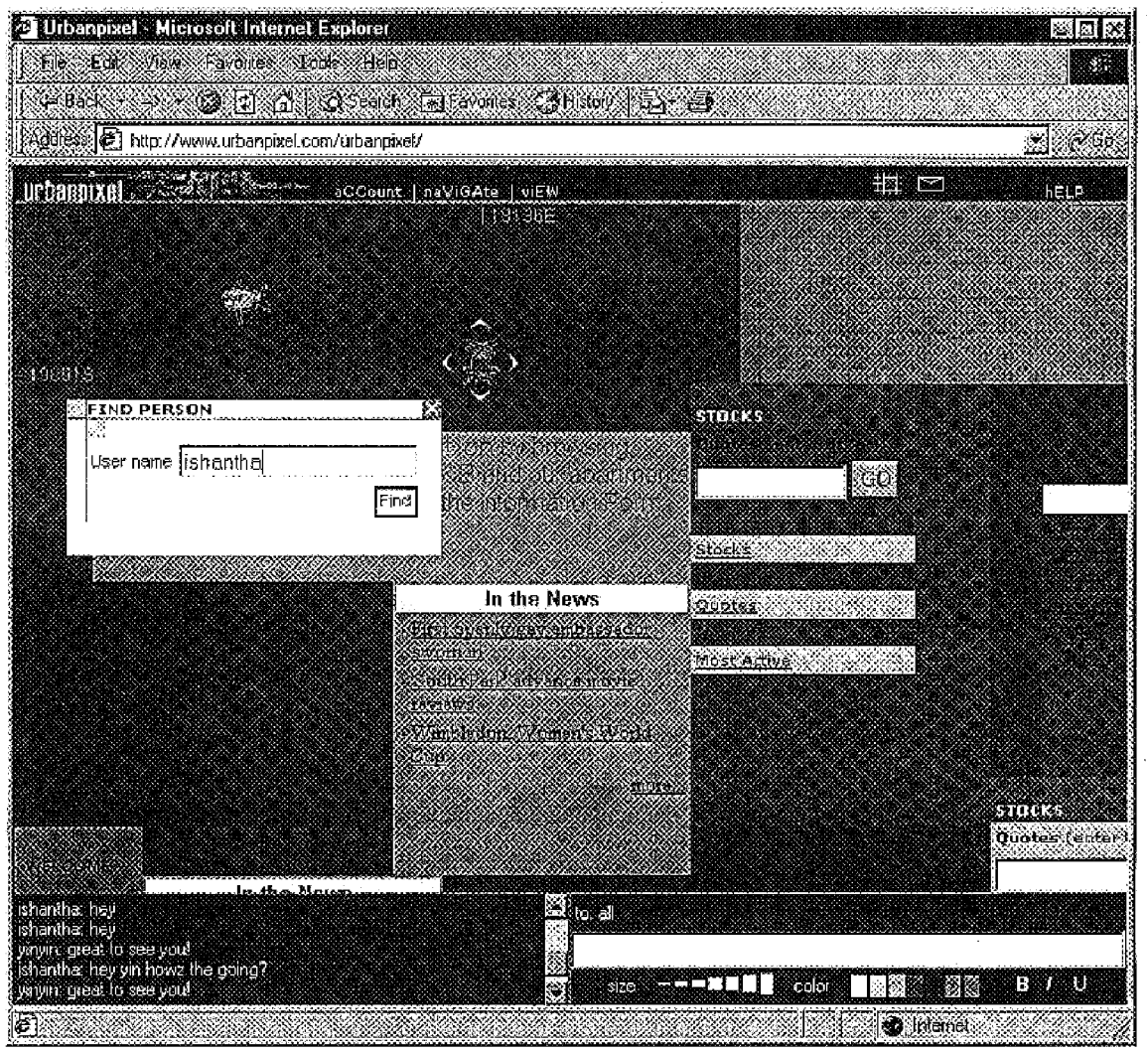

As shown in FIG. 9F, the Find person feature allows a user to find another user anywhere in the landscape and transport him/herself to their location.

Scenario 7: Create New Plot

Figure 9G:
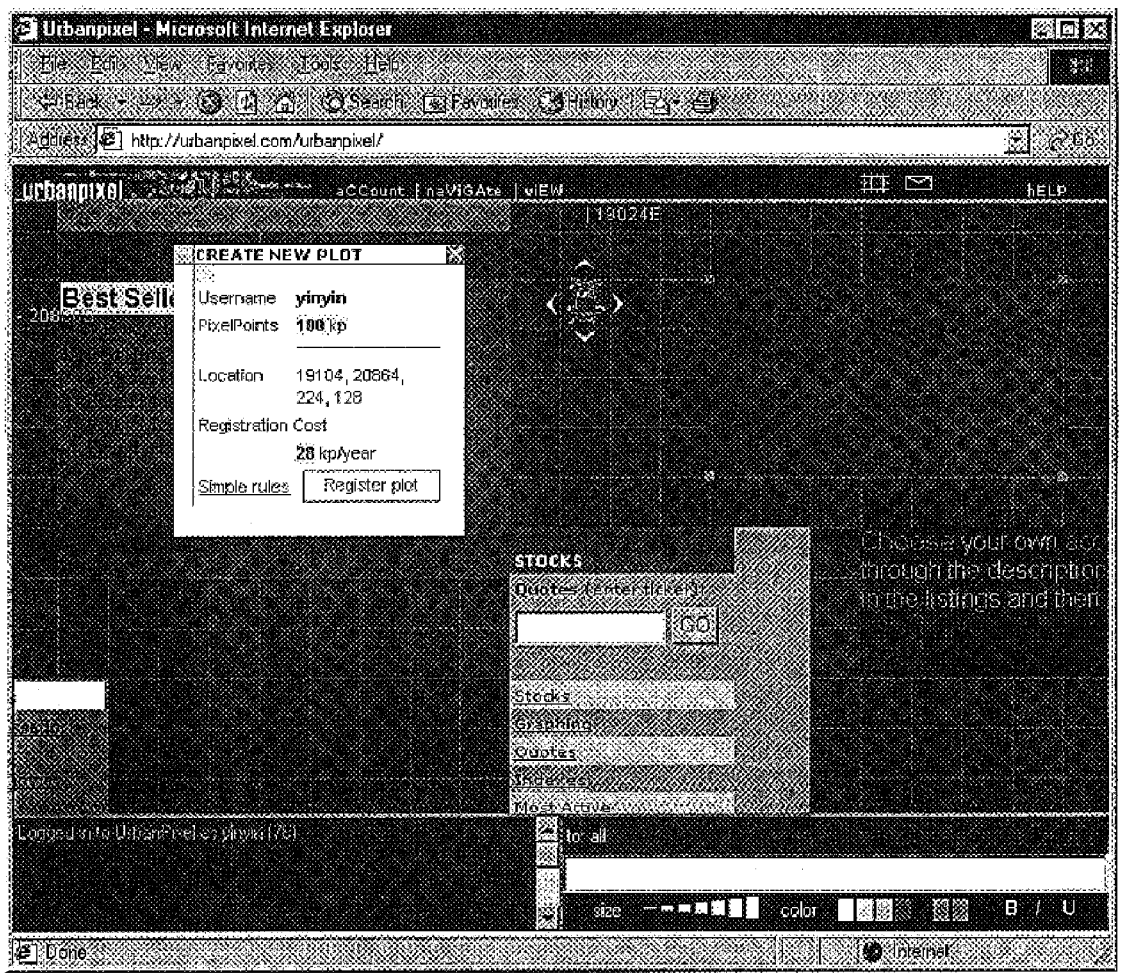
Figure 9A:
Figure 9:

As shown in FIG. 9G, in creating a new plot, the user chooses the size of the plot in a non-occupied area in the landscape. The user must also have enough PixelPoints in their account to register the plot for a year. As the user chooses the plot size, the cost for the plot is dynamically updated in the lease form. When the form is submitted, the server checks to make sure the plot does not overlap another plot and the user has enough PixelPoints in their account to buy the lease they've requested.

As shown in FIG. 9H, after purchasing a plot, the user will be asked to submit content for the plot. The plot can have a title, keywords describing its content, a representative color, etc. The user can either point the plot to a URL or submit HTML. The owner can click on their plot anytime to edit its content. The owner can edit the plot's content, delete the plot (sell it back to the system operator) or resize a plot.

Scenario 9: View Plot Information

As shown in FIG. 9I, users can get information on any existing plot, such as owner, contact info, comments, etc. If the plot does not belong to the user, he/she can "make an offer" to buy the plot from the owner. If the plot does belong to the user, the user can choose to edit the plot content, resize or move the plot, and sell the plot to another user.

Scenario 10: Conference Chat

Figure 9J:
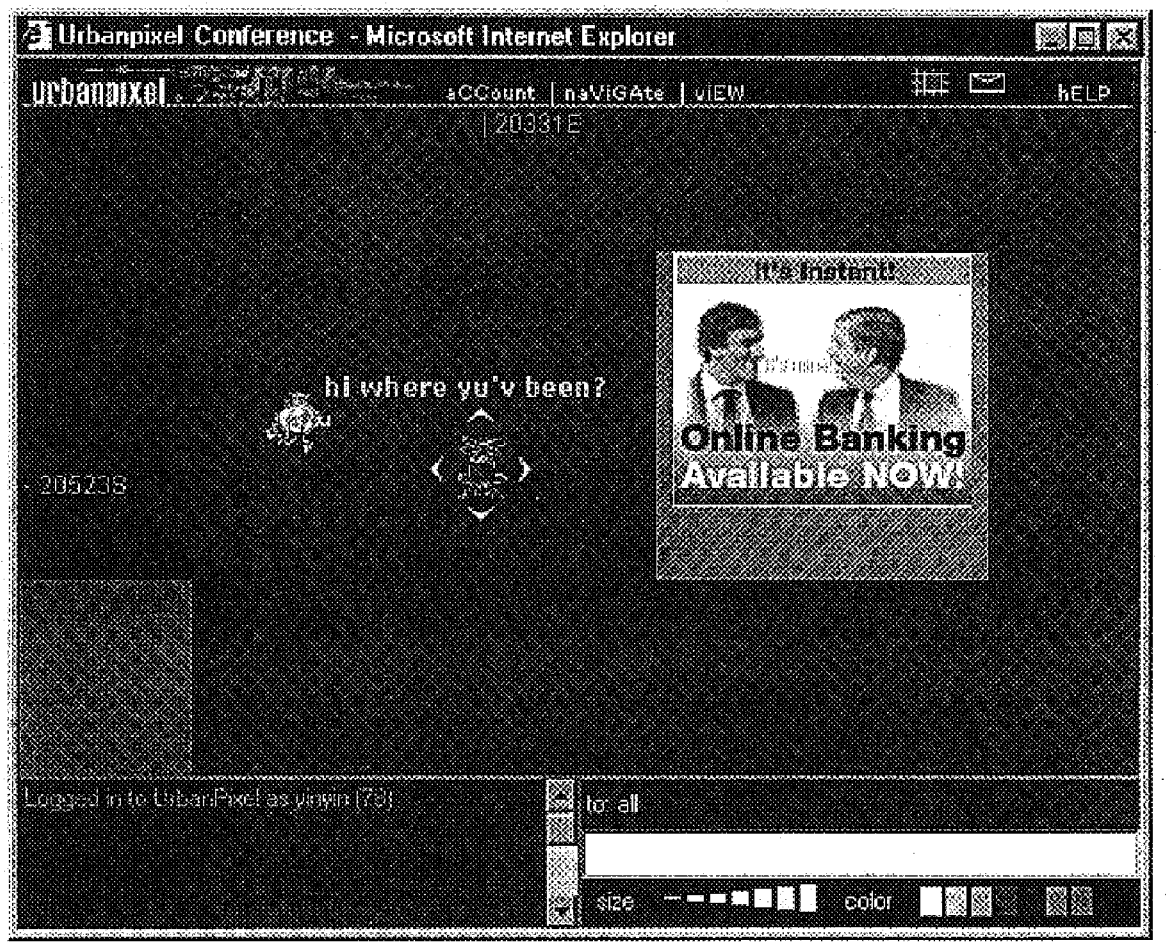

As shown in FIG. 9J, users can invite friends to a private conference chat. When a user creates a conference, a new window duplicating the host's spatial context appears with all the participants' proxies represented inside the window. Participants can chat using the chat tool at the bottom of the conference window.

Scenario 11: Follow Me

Figure 9K:
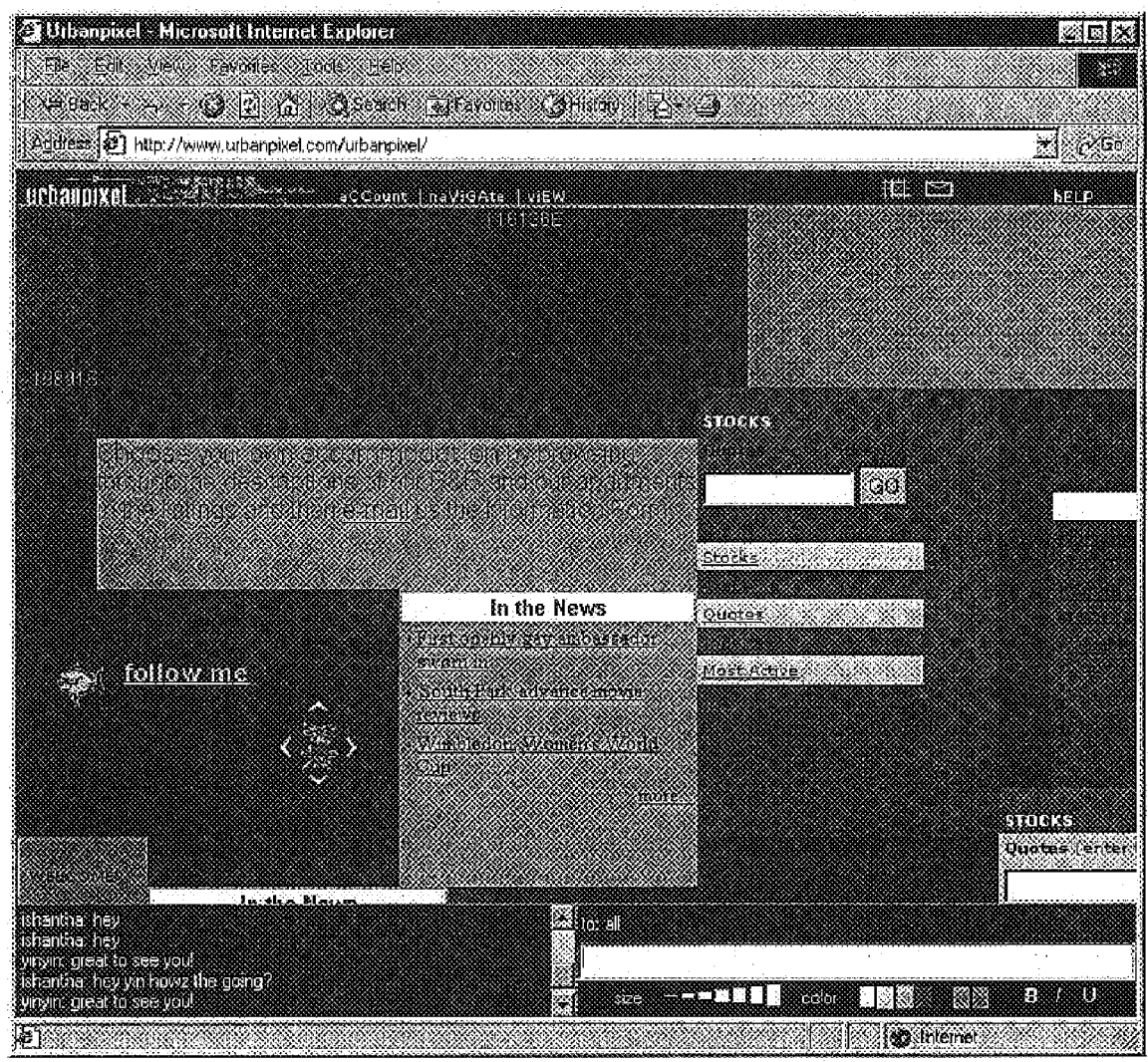

As shown in FIG. 9K, a user can invite other users to follow him/her as he/she pans the space. The user who issued the invitation is the leader and as he/she browses (pan in the space) users who accepted the invitation move automatically as the leader moves his/her proxy. An extension of this feature is co-browsing in which the followers' content updates to mirror the leader's view. This feature allows a group of users to sync their browsing actions thereby enabling the group to see the same content.

Scenario 12: MiniMap View

Figure 9L:
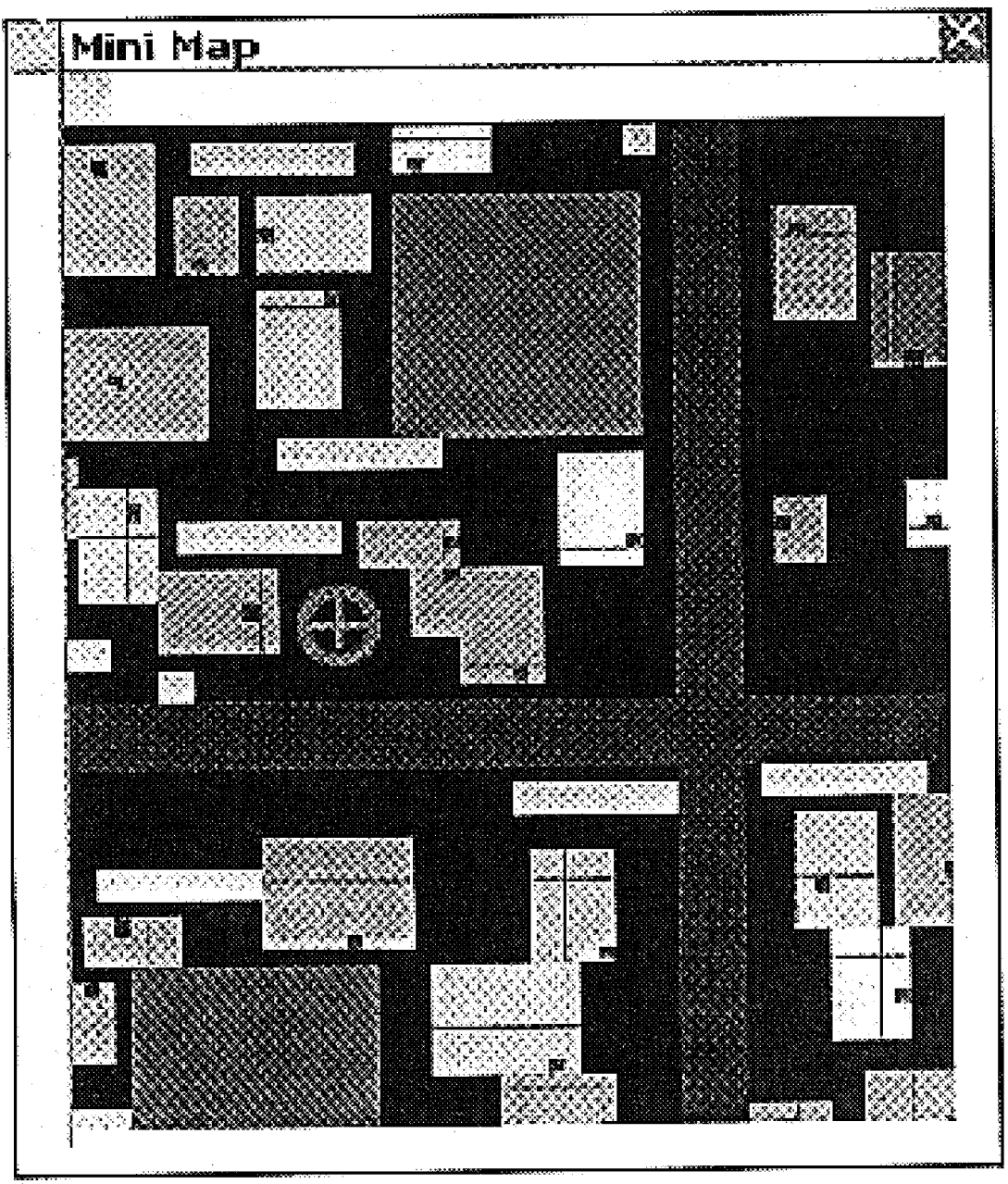

As shown in FIG. 9L, a miniature map allows the user to see where they are in reference to the larger landscape. Users can jump to regions of the landscape using the map and zoom in their current local area.

Scenario 13: Visualization Map View

Figure 9M:
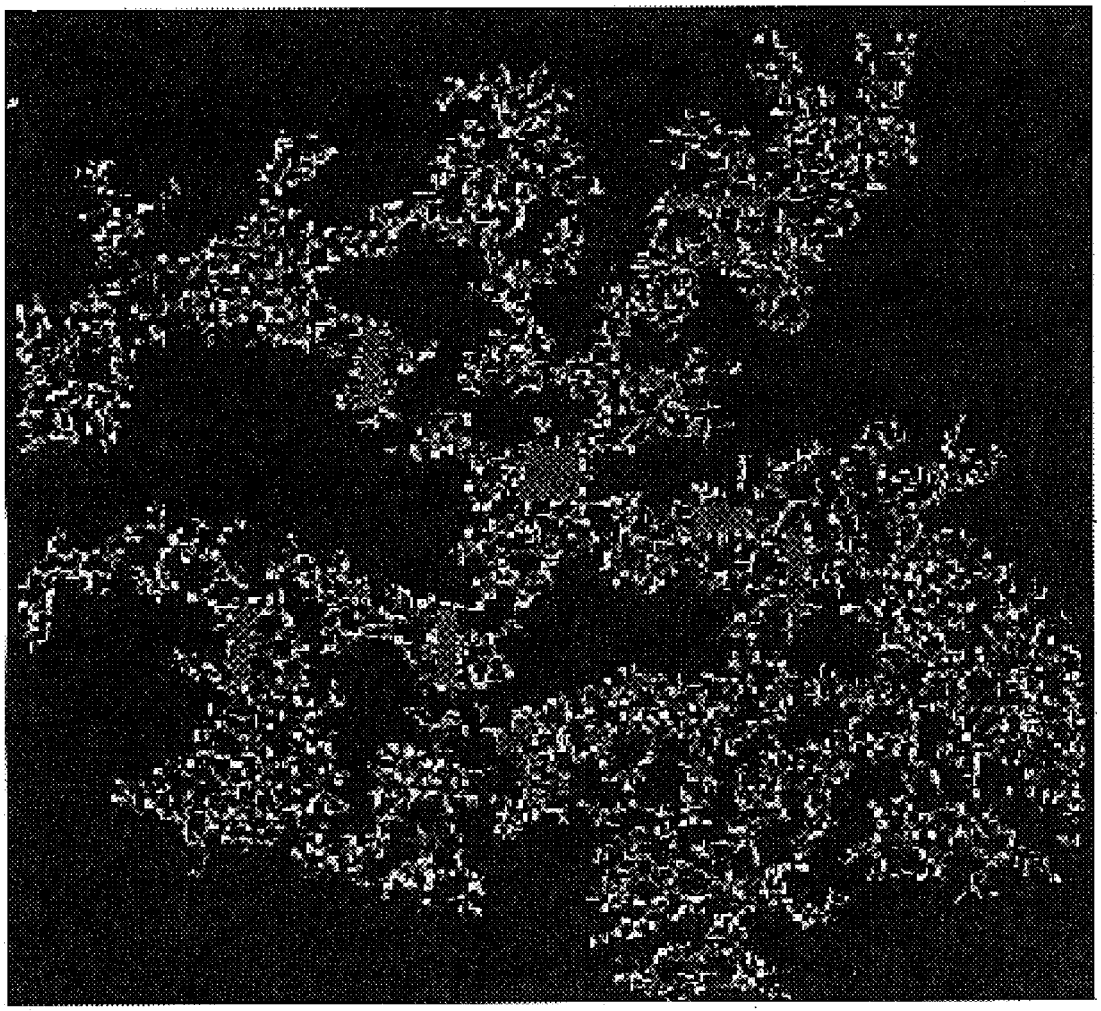

As shown in FIG. 9M, the map view shows the entire landscape. The ability to zoom in and zoom out of the map enables users to reveal or hide details. Categories (e.g., representing the top fifty most popular keywords) are used to highlight areas that match that those keywords. In addition, users can view population density in the different regions of the landscape. Search results can also be visualized in the map view.

CONCLUSION

Although the foregoing invention has been described in some detail for purposes of clarity of understanding, it will be apparent that certain changes and modifications may be practiced within the scope of the appended claims. For instance, although the present invention has been described in terms of a web browsing interface incorporating several novel features, some or all of these features could also be used independently. Therefore, the described embodiments should be taken as illustrative and not restrictive, and the invention should not be limited to the details given herein but should be defined by the following claims and their full scope of equivalents.

What is claimed is:

1. A computer-implemented method for facilitating browsing of information on a computer network, the method comprising transmitting first successive portions of a pre-existing virtual landscape to a first client platform on the computer network thereby facilitating navigation within the virtual landscape by a first user at the first client platform, the virtual landscape representing spatial relationships among a plurality of virtual plots, each virtual plot containing browsable content, each successive portion of the virtual landscape representing a graphical view of a subset of the spatial relationships among the virtual plots, the method further comprising transmitting second successive portions of the virtual landscape to a second client platform thereby facilitating navigation within the virtual landscape by a second user at the second client platform which is substantially simultaneous with the navigation by the first user at the first client platform, wherein a representation of the second user is included with the first successive portions of the virtual landscape and a representation of the first user is included with the second successive portions of the virtual landscape where the first successive portions overlap the second successive portions.

2. The method of claim 1 wherein the virtual landscape includes negative space not occupied by the virtual plots.

3. The method of claim 2 further comprising replacing a portion of the negative space with a new virtual plot.

4. The method of claim 3 where the new virtual plot is initially empty, the method further comprising populating the new virtual plot with new content in response to input received from a remote user corresponding to the new virtual plot.

5. The method of claim 4 further comprising making the new virtual plot and the new content visible substantially in real time to a plurality of users viewing the virtual landscape.

6. The method of claim 2 further comprising moving a first one of the virtual plots to a portion of the negative space in response to input received from a remote user corresponding to the first virtual plot.

7. The method of claim 1 further comprising updating the virtual landscape to reflect movement of the first virtual plot substantially in real time to a plurality of users viewing the virtual landscape.

8. The method of claim 1 wherein the spatial relationships relate the virtual plots in two dimensions.

9. The method of claim 1 further comprising generating the virtual landscape.

10. The method of claim 1 further comprising storing the virtual landscape on at least one server platform on the computer network.

11. The method of claim 1 wherein the first and second successive portions of the virtual landscape are suitable for display in a browser window on the first client platform.

12. The method of claim 1 wherein each of the first and second successive portions of the virtual landscape represents a plurality of closely related graphical views, the navigation within the virtual landscape simulating panning across the virtual landscape.

13. The method of claim 1 wherein each of the first and second successive portions of the virtual landscape represent graphical views having different scales, the navigation within the virtual landscape simulating zooming in and out on the virtual landscape.

14. The method of claim 13 wherein the first and second successive portions of the virtual landscape represent any of all of the virtual plots in the virtual landscape, a subset of the virtual plots, a single virtual plot, and a subregion within a virtual plot.

15. The method of claim 13 wherein the graphical views having different scales represent different levels of detail on a same level of abstraction of the content contained in the virtual plots.

16. The method of claim 1 wherein each of the first and second successive portions of the virtual landscape represent first and second graphical views, the navigation within the virtual landscape simulating jumping between corresponding locations in the virtual landscape.

17. The method of claim 1 further comprising adjusting the spatial relationships among the virtual plots in response to user input from a plurality of client platforms, thereby continually evolving an organization for the virtual landscape in accordance with the user input.

18. The method of claim 17 wherein adjusting the spatial relationships comprises any of adding new virtual plots, moving existing virtual plots, altering existing virtual plots, and expanding the virtual landscape.

19. The method of claim 18 further comprising facilitating financial transactions relating to alterations of the virtual landscape.

20. The method of claim 17 further comprising making adjustments to the spatial relationships among the virtual plots visible substantially in real time to a plurality of users viewing the virtual landscape.

21. The method of claim 1 wherein the representations of the first and second users comprise first and second graphical objects operable to be displayed on the second and first client platforms, respectively.

22. The method of claim 21 further comprising facilitating one of creation and selection of the first and second graphical objects by the first and second users.

23. The method of claim 1 further comprising facilitating communication between the first and second user within the virtual landscape.

24. The method of claim 1 wherein the first and second successive portions of the virtual landscape are transmitted to the first and second client platforms from at least one server, and wherein the content contained in the each of the virtual plots corresponds to one of content stored on the at least one server, and content served from remote servers independent of the at least one server.

25. The method of claim 1 wherein at least one of the virtual plots corresponds to a web site.

26. The method of claim 1 wherein at least one virtual plot comprises a lower level virtual landscape comprising lower level virtual plots.

27. The method of claim 1 wherein the virtual landscape comprises a higher level virtual plot within a higher level virtual landscape.

28. The method of claim 1 further comprising controlling access to restricted portions of the virtual landscape.

29. A computer system comprising memory and at least one processor operable to transmit first successive portions of a pre-existing virtual landscape stored in the memory to a first client platform thereby facilitating navigation within the virtual landscape by a first user at the first client platform, the virtual landscape representing spatial relationships among a plurality of virtual plots, each virtual plot containing browsable content, each successive portion of the virtual landscape representing a graphical view of a subset of the spatial relationships among the virtual plots, the at least one processor further being operable to transmit second successive portions of the virtual landscape to a second client platform thereby facilitating navigation within the virtual landscape by a second user at the second client platform which is substantially simultaneous with the navigation by the first user at the first client platform, wherein a representation of the second user is included with the first successive portions of the virtual landscape and a representation of the first user is included with the second successive portions of the virtual landscape where the first successive portions overlap the second successive portions.

30. A computer program product for facilitating browsing of information on a computer network, the computer program product comprising at least one computer-readable medium having computer program instructions stored therein which are operable to transmit first successive portions of a pre-existing virtual landscape to a first client platform thereby facilitating navigation within the virtual landscape by a first user at the first client platform, the virtual landscape representing spatial relationships among a plurality of virtual plots, each virtual plot containing browsable content, each successive portion of the virtual landscape representing a graphical view of a subset of the spatial relationships among the virtual plots, the computer program instructions further being operable to transmit second successive portions of the virtual landscape to a second client platform thereby facilitating navigation within the virtual landscape by a second user at the second client platform which is substantially simultaneous with the navigation by the first user at the first client platform, wherein a representation of the second user is included with the first successive portions of the virtual landscape and a representation of the first user is included with the second successive portions of the virtual landscape where the first successive portions overlap the second successive portions.

\* \* \* \* \*